US011395133B2

(12) United States Patent
Kim et al.

(10) Patent No.: US 11,395,133 B2
(45) Date of Patent: Jul. 19, 2022

(54) METHOD FOR PROVIDING COMMUNICATION SERVICE USING SECURE ELEMENT AND ELECTRONIC DEVICE THEREOF

(71) Applicant: Samsung Electronics Co., Ltd, Suwon-si (KR)

(72) Inventors: Sung Oh Kim, Suwon-si (KR); Jeong Don Kang, Suwon-si (KR); Jae Hyeon Seo, Suwon-si (KR); Sang Soo Lee, Suwon-si (KR); Sang Hwi Lee, Suwon-si (KR); Ji Eun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 16/226,206

(22) Filed: Dec. 19, 2018

(65) Prior Publication Data

US 2019/0191298 A1     Jun. 20, 2019

(30) Foreign Application Priority Data

Dec. 19, 2017  (KR) .......................... 10-2017-0174960

(51) Int. Cl.
*H04W 8/20* (2009.01)
*H04W 4/50* (2018.01)
*H04L 9/40* (2022.01)
*H04W 12/71* (2021.01)
(Continued)

(52) U.S. Cl.
CPC ......... *H04W 8/205* (2013.01); *H04L 63/0853* (2013.01); *H04W 4/50* (2018.02);
(Continued)

(58) Field of Classification Search
USPC ........................................................ 370/329
See application file for complete search history.

(56) References Cited

U.S. PATENT DOCUMENTS 9,100,810 B2   8/2015  Schell et al.
9,549,313 B2   1/2017  Park et al.
(Continued)

FOREIGN PATENT DOCUMENTS

EP          3422751 A1      1/2019
KR    10-2015-0122018 A    10/2015
(Continued)

OTHER PUBLICATIONS

ISR/KR, "International Search Report and Written Opinion of the International Searching Authority," International Application No. PCT/KR2018/016257, dated Apr. 1, 2019, 9 pages.
(Continued)

*Primary Examiner* — Alpus Hsu
*Assistant Examiner* — Hooman Houshmand

(57) ABSTRACT

An electronic device includes a wireless communication circuit, a secure element configured to store information, the information including a first identifier indicating the secure element and at least one second identifier indicating a profile for a wireless communication service provided by at least one cellular network, at least one processor, and a memory configured to store instructions. The instructions, when executed, cause the at least one processor to transmit the first identifier to a first external server, via the wireless communication circuit, receive a second identifier and a profile associated with the second identifier from the second external server via the wireless communication circuit and store the second identifier and the profile in the secure element, and receive a first request, including the second identifier, associated with management of the profile, from the first external server.

13 Claims, 22 Drawing Sheets

(51) Int. Cl.
*H04W 12/72* (2021.01)
*H04W 8/18* (2009.01)

(52) U.S. Cl.
CPC ........... *H04W 12/71* (2021.01); *H04W 12/72* (2021.01); *H04W 8/183* (2013.01)

(56) References Cited

U.S. PATENT DOCUMENTS

| | | | |
|---|---|---|---|
| 9,860,749 B2 | 1/2018 | Huxham et al. | |
| 10,075,205 B2 | 9/2018 | Lee et al. | |
| 10,111,089 B2 | 10/2018 | Park et al. | |
| 10,638,314 B2 | 4/2020 | Park et al. | |
| 11,134,372 B2* | 9/2021 | Park | H04L 67/306 |
| 2006/0168137 A1* | 7/2006 | Lim | H04L 67/306 |
| | | | 709/219 |
| 2012/0108204 A1* | 5/2012 | Schell | H04W 8/205 |
| | | | 455/411 |
| 2015/0303966 A1 | 10/2015 | Lee et al. | |
| 2015/0373538 A1 | 12/2015 | Huang et al. | |
| 2016/0127132 A1* | 5/2016 | Lee | H04L 9/0819 |
| | | | 713/156 |
| 2017/0308881 A1 | 10/2017 | Gravallon et al. | |
| 2018/0124595 A1 | 5/2018 | Park et al. | |
| 2019/0104401 A1 | 4/2019 | Park et al. | |
| 2019/0324735 A1 | 10/2019 | Park | |

FOREIGN PATENT DOCUMENTS

| | | |
|---|---|---|
| KR | 10-2016-0020816 A | 2/2016 |
| KR | 10-2016-0120598 A | 10/2016 |
| KR | 10-2017-0074752 A | 6/2017 |
| KR | 10-2017-0109467 A | 9/2017 |
| KR | 10-2017-0130801 A | 11/2017 |
| KR | 10-2017-0135617 A | 12/2017 |
| WO | 2014191952 A1 | 12/2014 |
| WO | 2016153323 A1 | 9/2016 |

OTHER PUBLICATIONS

Supplementary European Search Report in connection with European Application No. 18890159.9 dated May 19, 2020, 9 pages.
GSM Association, Official Document SGP.21—RSP Architecture, Version 2.1, Feb. 27, 2017, 94 pages.
GSM Association, Official Document SGP.22—RSP Technical Specification, Version 2.2, Sep. 12, 2017, 264 pages.
Korean Intellectual Property Office, "Notice of Preliminary Rejection" dated Sep. 15, 2021, in connection with corresponding Korean Patent Application No. 10-2017-0174960, 15 pages.
Intellectual Property India, "Examination report under sections 12 & 13 of the Patents Act," dated Mar. 10, 2022, in connection with Indian Patent Application No. 202017022624, 5 pages.

* cited by examiner

METHOD FOR PROVIDING COMMUNICATION SERVICE USING SECURE ELEMENT AND ELECTRONIC DEVICE THEREOF

CROSS-REFERENCE TO RELATED APPLICATION

This application is based on and claims priority under 35 U.S.C. § 119 to Korean Patent Application No. 10-2017-0174960 filed on Dec. 19, 2017 in the Korean Intellectual Property Office, the disclosure of which is incorporated by reference herein its entirety.

BACKGROUND

1. Field

The present disclosure relates to wireless communication technologies using a secure element embedded in an electronic device.

2. Description of Related Art

A secure element may be a component for a secure transaction and secure maintenance in an electronic device. For example, the secure element may be implemented in the form of being detached from the electronic device or in the form of being embedded in the electronic device. The secure element may include, for example, a universal integrated circuit card (UICC) or an embedded UICC (eUICC).

The UICC may be a smart card capable of playing a role as a module for user authentication in the electronic device. According to a communication mode, the UICC may be called a subscriber identity module (SIM) card or a universal SIM (USIM) card. In markets such as Chinese or Latin American markets, electronic devices, each of which are equipped with two or more UICCs, have been provided. As such, electronic devices, each of which has two or more UICCs, may support a dual SIM and dual standby (DSDS) function, a dual SIM and dual active (DSDA) function, or a communication function which uses a plurality of SIMs. An electronic device using a plurality of physical SIM cards may support a multi profile for performing communication associated with several profiles.

Recently, there has been an increase in using an eUICC implemented in a form where it is impossible to be detached because the eUICC is embedded in an electronic device. The eUICC may download and use a profile in an over the air (OTA) manner to receive a mobile communication service of a mobile network operator (MNO). A user may select and use a desired profile among a plurality of profiles for communication of an electronic device equipped with the eUICC.

The above information is presented as background information only to assist with an understanding of the present disclosure. No determination has been made, and no assertion is made, as to whether any of the above might be applicable as prior art with regard to the present disclosure.

SUMMARY

An eUICC may be installed in a plurality of devices, such as an Internet or things (IoT) device, a wearable device, or a tablet, due to features capable of managing a plurality of profiles in one eUICC and advantages of a hardware mount area.

A user may have demand for managing a device equipped with an eUICC, through one interface. However, in a conventional eUICC related global systems for mobile communications association (GSMA) remote SIM provisioning (RSP) technical specification, a method where one user (or one electronic device) manages profiles in a plurality of devices is not defined, so the user may manage an eUICC installed in each device using only a local profile assistant (LPA) of a corresponding electronic device.

Embodiments according to the present disclosure are to address at least the above-mentioned problems and/or disadvantages and to provide at least the advantages described below. Accordingly, an aspect of the present disclosure is to provide an electronic device for providing a service to use at least one or more profiles in several devices, a server, and a method.

In certain embodiments according the present disclosure, an electronic device is provided. The electronic device may include a wireless communication circuit configured to provide wireless communication of at least one cellular network, a secure element configured to store information associated with the wireless communication, the information including a first identifier indicating the secure element and at least one second identifier indicating a profile for a wireless communication service provided by the at least one cellular network, at least one processor configured to be operatively connected with the wireless communication circuit and the secure element, and a memory configured to be operatively connected with the at least one processor and store instructions. The instructions, when executed, may cause the at least one processor to transmit the first identifier to a first external server configured to store the first identifier to be associated with a user account, via the wireless communication circuit, receive a second identifier and a profile associated with the second identifier from the second external server via the wireless communication circuit and store the second identifier and the profile in the secure element, and receive a first request, including the second identifier, associated with management of the profile, from the first external server via the wireless communication circuit.

In various embodiments according to the present disclosure, an electronic device is provided. The electronic device may include a wireless communication circuit configured to provide wireless communication of at least one cellular network, a secure element circuit configured to store a profile for a wireless communication service provided by the at least one cellular network, at least one processor configured to be operatively connected with the wireless communication circuit and the secure element circuit, and a memory configured to be operatively connected with the at least one processor and store instructions. The instructions, when executed by the at least one processor, may cause the at least one processor to obtain at least one second identifier indicating a profile stored in an external device, via the wireless communication circuit and transmit a request, including a first identifier indicating the electronic device and a specific second identifier among the at least one second identifier, associated with management of a profile corresponding to the specific second identifier, via the wireless communication circuit.

In certain embodiments according to this disclosure, a server is provided. The server may include a wireless communication circuit configured to provide wireless communication of at least one cellular network, at least one processor configured to be operatively connected with the wireless communication circuit, and a memory configured to be operatively connected with the at least one processor and store instructions. The instructions, when executed by the at least one processor, may cause the at least one processor to obtain a request associated with management of a profile stored in a secure element of a second electronic device, from a first electronic device including a secure element configured to store a profile for a wireless communication service provided to the first electronic device by the at least one cellular network and transmit the request associated with the management of the profile to the second electronic device.

According to embodiments as disclosed in the present disclosure, the user may manage secure elements of a plurality of electronic devices in one electronic device.

According to embodiments as disclosed in the present disclosure, the electronic device may flexibly use one profile or a limited number of profiles in several devices.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
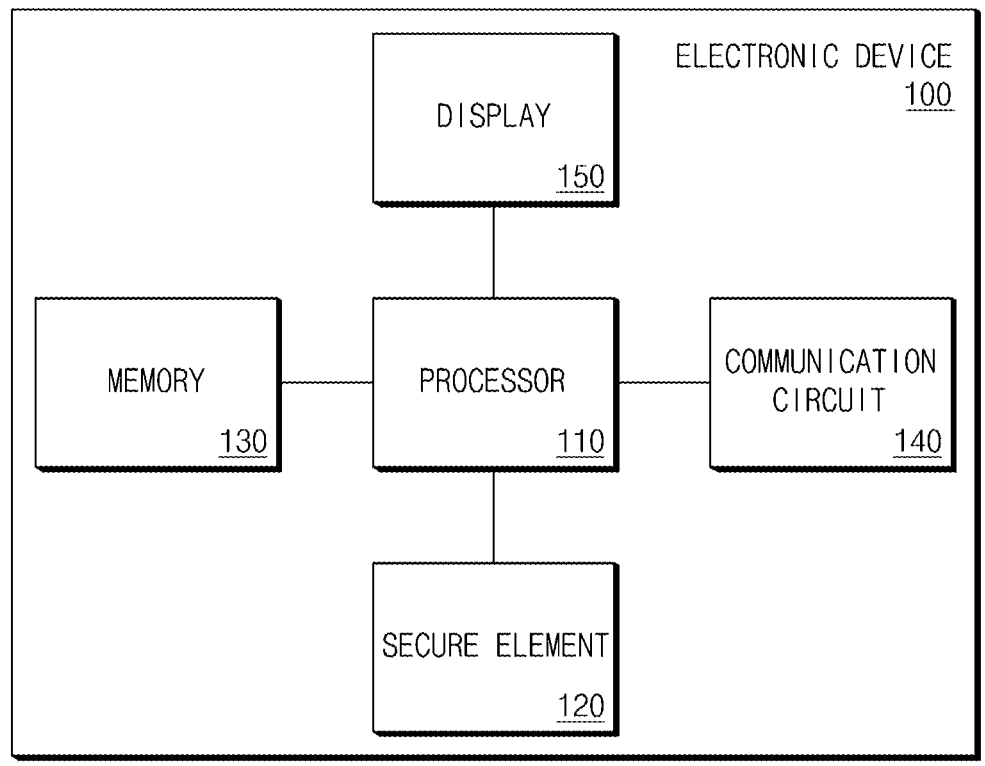
FIG. 1 illustrates, in block diagram format a configuration of an electronic device according to certain embodiments.

FIG. 1 illustrates, in block diagram format, a configuration of an electronic device according to some embodiments.

Referring to the non-limiting example of FIG. 1, an electronic device 100 may include a processor 110, a secure element 120, a memory 130, a communication circuit 140, and a display 150. The components of the electronic device 100 shown in FIG. 1 may be an exemplary example and this disclosure covers various modifications, implementing various embodiments. For example, the electronic device 100 may include the same components as an electronic device 2201 shown in FIG. 22 or may be suitably modified using the components.

According to certain embodiments, the processor 110 may execute instructions stored in the memory 130, and may perform an operation according to various embodiments disclosed in the present disclosure or may control other components to perform the operation. For example, the processor 110 may deliver a command message or a request message to the secure element 120 and may receive a response message. The processor 110 may store information in the memory 130 or may read information stored in the memory 130 to manage a profile stored in the secure element 120. The processor 110 may communicate with an external device via the communication circuit 140. The processor 110 may support wired communication or wireless communication associated with a profile stored in the secure element 120. The processor 110 may interact with a user through the display 150. In addition, at least some of operations of the processor 110 may refer to a global systems for mobile communications association (GSMA) technical specification (hereinafter referred to as "GSMA remote subscriber identity module (SIM) provisioning (RSP)") such as "SGP.22-RSP spec version X" or "SGP.21-RSP spec version X" (where X denotes the version number of the cited specification).

According to various embodiments, the processor 110 may include an application processor and/or a communication processor. A detailed description of the processor 110 will be given with reference to FIGS. 5A to 5C.

According to some embodiments, the secure element 120 (e.g., a subscriber identification module 2296 of FIG. 22) may store at least one profile. According to certain embodiments, the secure element 120 may store an identifier indicating the profile. The secure element 120 may store an identifier indicating the electronic device 100. The electronic device 100 may access its identifier, a profile, and/or an identifier of the profile using application programming interfaces.

The profile may be information which is provisioned to the secure element 120 or is managed in the secure element 120. The profile may correspond to a wireless communication service provided by a cellular network. For example, a profile stored in the electronic device 100 may correspond to a wireless communication service provided to the electronic device 100.

According to certain embodiments, the secure element 120 may manage a profile based on a command, a command request, or a request of the processor 110 and may deliver a response to the processor 110. In addition, an operation of the secure element 120 according to various embodiments disclosed in the present disclosure may comply with the GSMA technical specification.

According to various embodiments, the secure element 120 may be a software component or a hardware component. The secure element 120 may be, for example, a component embedded in the electronic device 100 for a secure transaction and secure maintenance. The secure element 120 may be an embedded SIM (eSIM) or an embedded universal integrated circuit card (eUICC). The secure element 120 may be stored in the memory 130. Hereinafter, in certain embodiments disclosed in the present disclosure, the operation of the electronic device 100 is described by using the eUICC as one example. However, embodiments are not limited thereto. For example, the secure element 120 may be various components for providing a corresponding function other than the eUICC.

According to certain embodiments, the memory 130 (e.g., a memory 2230 of FIG. 22) may store information for supporting a service according to a profile. The memory 130 may store information generated by the processor 110. The memory 130 may store a protocol stack which supports a specific communication protocol. The memory 130 according to various embodiments may store instructions causing the processor 110 to perform an operation according to certain embodiments disclosed in the present disclosure. The memory 130 according to certain embodiments may include the secure element 120 in its partial area. In addition, the memory 130 may store a variety of information according to various embodiments disclosed in the present disclosure.

According to certain embodiments, the memory 130 and/or the secure element 120 may store information according to various embodiments disclosed in the present disclosure. For example, the memory 130 and/or the secure element 120 may store an identifier of the electronic device 100, an identifier of the secure element 120, and/or an identifier of a profile.

The identifier of the electronic device 100 and/or the identifier of the secure element 120 may be stored in, for example, the secure element 120. The identifier may be an eUICC identification (EID). The EID may be understood as an identifier indicating the secure element 120 or indicating the electronic device 100 including the secure element 120.

According to certain embodiments, the communication circuit 140 may communicate with an external device over a network. For example, the communication circuit 140 may communicate with the network using wired communication or wireless communication associated with a specific profile. The wired communication or the wireless communication may be provided by a mobile network operator (MNO). According to various embodiments, the wireless communication may comply with a cellular communication protocol. According to an embodiment, the communication circuit 140 may be included in a communication module 2290 of FIG. 22.

The display 150 may be used to interact with a user input. For example, the display 150 may display a (remote) profile management result of the secure element 120, information generated by the processor 110 based on the (remote) profile management result, or information (e.g., profile state information) obtained from an external server. The display 150 may include a touch screen. The display 150 may obtain, for example, a touch input of a user through the touch screen. The display 150 may deliver the touch input of the user to the processor 110.

According to various embodiments disclosed in the present disclosure, the electronic device 100 may fail to include some of the components or may further include other component(s). For example, the electronic device 100 may fail to include the display 150.

Figure 2:
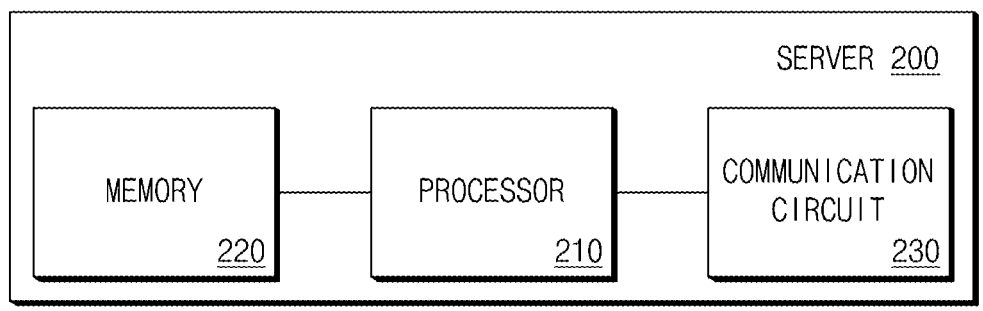
FIG. 2 illustrates, in block diagram format, a configuration of a server according to certain embodiments.

FIG. 2 illustrates, in block diagram format, a configuration of a server according to certain embodiments.

Referring to the non-limiting example of FIG. 2, a server 200 may include a processor 210, a memory 220, and a communication circuit 230. The components of the server 200 shown in FIG. 2 are illustrative, and this disclosure covers various modifications thereof. For example, the server 200 may include the same components as an electronic device 2201 shown in FIG. 22 or may be suitably modified using the components.

According to various embodiments, the processor 210 may execute instructions stored in the memory 220, and may perform an operation according to various embodiments disclosed in the present disclosure or may control other components to perform the operation. For example, the processor 210 may transmit or receive a signal with an electronic device (e.g., an electronic device 100 of FIG. 1) via the communication circuit 230 and may process a signal received from the electronic device, thus storing the processed information in the memory 220.

According to some embodiments, the processor 210 may include an application processor and/or a communication processor.

According to certain embodiments, the memory 220 may store information generated by the processor 210 or information received from the electronic device. The memory 220 may store a protocol stack which supports a specific communication protocol. The memory 220 according to various embodiments may store instructions causing the processor 210 to perform an operation according to some embodiments disclosed in the present disclosure.

According to certain embodiments, the communication circuit 230 may communicate with an external device (e.g., the electronic device 100 of FIG. 1) over a network. For example, the communication circuit 230 may communicate with the network using wired communication or wireless communication associated with a specific protocol. The wired communication or the wireless communication may be provided by an MNO.

According to various embodiments, the server 200 may transmit a profile to the electronic device 100. The server 200 may be a subscriber management system, such as a subscription manager-data preparation+(SM-DP+) server, and a subscription manager discovery service (SM-DS) server. Alternatively, the server 200 may be, for example, a server, such as an eUICC device management server, which manages a profile capable of being transmitted or shared between a plurality of electronic devices and stores a profile state of at least one electronic device.

Figure 3:
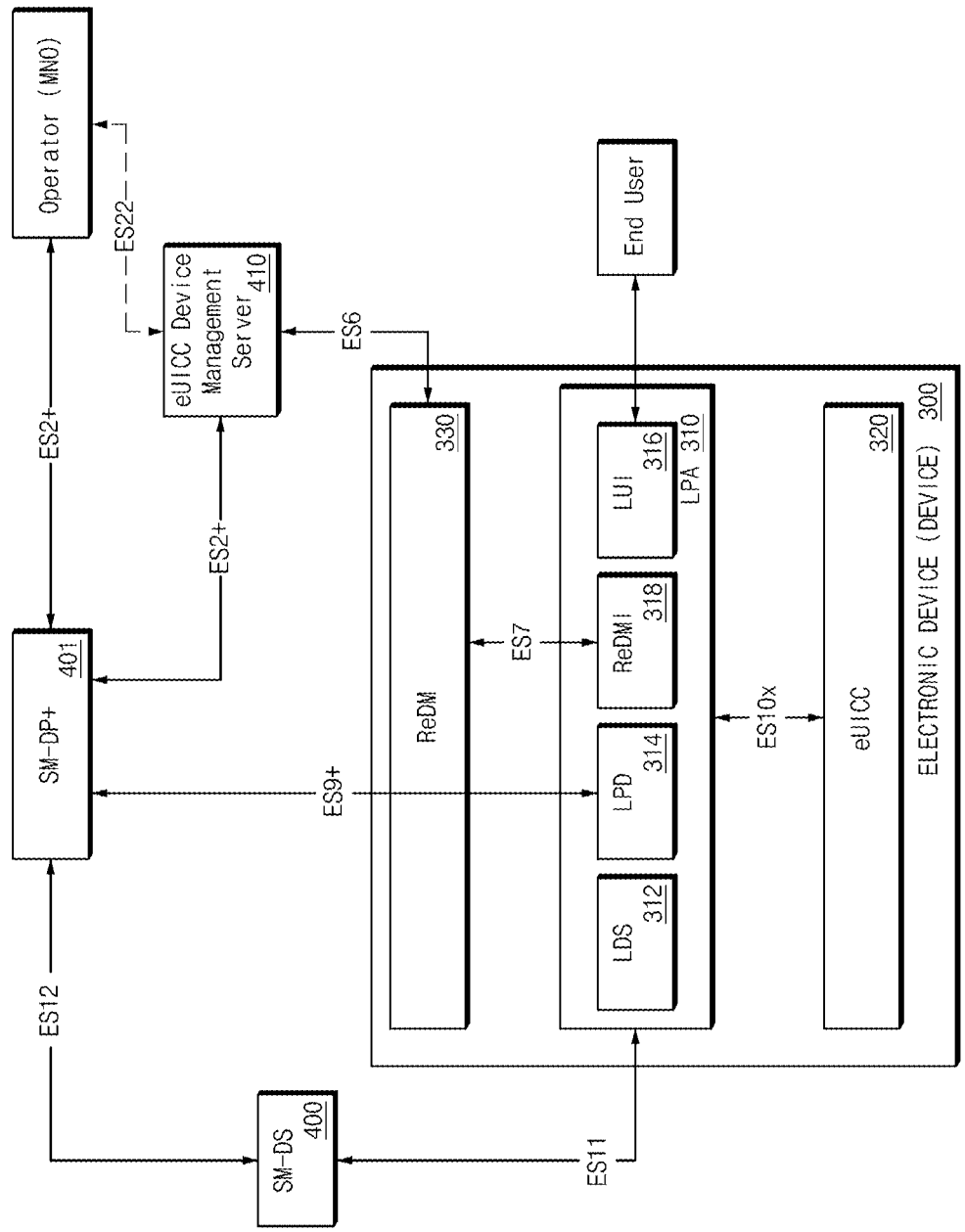
FIG. 3 illustrates a network architecture where an electronic device and a server operate, according to various embodiments.

FIG. 3 illustrates, in block diagram format, a network architecture where an electronic device and a server operate, according to some embodiments.

Referring to the non-limiting example of FIG. 3, an electronic device 300 (e.g., an electronic device 100 of FIG. 1) may transmit at least one of profiles stored in an eUICC 320 (e.g., a secure element 120 of FIG. 1) or information associated with the at least one of the profiles to an external server based on a request of a user (e.g., an end user of FIG. 3) or as desired. The electronic device 300 may communicate with an eUICC device management server 410.

To this end, the electronic device 300 may include components such as a remote eUICC device manager (ReDM) 330 and an ReDM interface (ReDMI) 318.

According to various embodiments, the electronic device 300 may retrieve an event registered with an SM-DS server 400 and may download a profile (or a profile package) from an SM-DP+ server 401. Each profile may correspond to an MNO (e.g., SKT, KT, or AT&T) or a communication service provided from the MNO.

According to some embodiments, the SM-DP+ server 401 may generate a profile and may deliver a profile package to an LPA 310 in a method with security. The profile package may include information associated with downloading a profile. The LPA 310 may register an event capable of downloading a profile with the SM-DS server 400.

According to various embodiments, the SM-DS server 400 may deliver an event capable of triggering profile installation to the LPA 310. The event may include an event identification (ID) and a server address. The LPA 310 may know the SM-DP+ server 401 capable of downloading a profile based on the event ID and the server address.

According to certain embodiments, the MNO (or an operator) may refer to a communication service provider and may request the SM-DP+ server 401 to prepare for a profile. The profile requested by the MNO may be a profile corresponding to each MNO or a communication service provided by the MNO.

In addition, the description of the SM-DP+ server 401, the SM-DS server 400, or the MNO may refer to a GSMA technical specification document.

The electronic device 300 may include the LPA 310 and the eUICC 320 (e.g., the secure element 120 of FIG. 1) to download the profile and receive a communication service associated with the MNO. Each component may be configured with software or hardware. According to some embodiments, the LPA 310 may be a software module implemented by a processor.

According to various embodiments, the LPA 310 may support profile management of the eUICC 320. The LPA 310 may deliver a command or request for profile management to the eUICC 320 and may process a response delivered from the eUICC 320. The LPA 310 may include at least one of a local discovery service (LDS) 312, a local profile download (LPD) 314, or a local user interface (LUI) 316. Each module may be implemented with software or hardware and may be operatively divided.

According to certain embodiments, the LPA 310 may deliver a command or request for profile management to the eUICC 320 and may process a response delivered from the eUICC 320. A profile management operation may include at least one of, for example, downloading, installing, enabling, disabling, or deleting a profile, retrieving or modifying profile information such as a profile list, or transferring or keeping a profile.

According to some embodiments, the LDS 312 may process an operation associated with an SM-DS. The LDS 312 may process, for example, a discovery request for the eUICC 320. The LDS 312 may retrieve an event kept in the SM-DS server 400. The event kept in the SM-DS server 400 may include information capable of downloading a profile.

According to various embodiments, the LPD 314 may support an operation associated with downloading a profile. The LPD 314 may communicate with the SM-DP+ server 401 and may download a profile package. The LPD 314 may support secure transmission between the SM-DP+ server 401 and the LPA 310 to deliver a profile package.

The LUI 316 may support an operation associated with a user interface to interact with the user (e.g., the end user of FIG. 3). The user may initiate a profile management operation through the LUI 316. The LUI 316 may obtain a user intent associated with the profile management operation. The user intent may be, for example, an operation of enabling or disabling a profile of the electronic device or an external electronic device.

The eUICC 320 may download a profile in an over-the-air (OTA) manner to use a mobile communication service of an MNO to differ from a conventional UICC. A plurality of profiles may be included in the eUICC 320. The user may select a profile through the LPA 310.

According to certain embodiments, the eUICC 320 may store a profile and may perform an operation associated with the profile. The eUICC 320 may obtain, for example, a command message associated with a profile and may generate a response message as a response to the command message. When enabling one profile, the eUICC 320 may implicitly disable a previously enabled profile.

A profile for a specific MNO may be stored in a secure domain in the eUICC 320. When a specific profile is enabled in the eUICC 320, it may access only an application or data associated with the specific profile. Another profile may fail to access the application or data associated with the specific profile.

According to some embodiments, various communication interfaces may be defined for communication between respective components in the electronic device 300, between the electronic device 300 and a server on a network or between servers. For example, information may be exchanged through an ES12 interface between the SM-DP+ server 401 and the SM-DS server 400. The SM-DP+ server 401 and the MNO may exchange information through an ES2+ interface. The SM-DS server 400 may communicate with the electronic device 300 (or the LPA 310) through an ES11 interface. The SM-DP+ server 401 and the LPA 310 (or the LPD 314) may exchange a signal through an ES9+ interface. The LPA 310 may exchange information with the eUICC 320 through an ES10x interface.

According to various embodiments, the electronic device 300 may transmit and receive profile information with an external device or the eUICC device management server 410. To this end, the electronic device 300 may include the ReDM 330 and the ReDMI 318. According to certain embodiments, the ReDM 330 and/or the ReDMI 318 may be implemented with hardware or software. For example, a processor (e.g., a processor 110 of FIG. 1) may perform a function of the ReDM 330 and/or the ReDMI 318.

According to some embodiments, the ReDM 330 may communicate with the eUICC device management server 410. The ReDM 330 may transmit and receive information, such as profile state information of the eUICC 320, a request and/or command associated with a profile, and an identifier of an external electronic device, with the eUICC device management server 410.

According to various embodiments, the ReDM 330 may obtain profile state information of each of all EUICC devices of a user, associated with the user registered with the EUICC device management server 410, and may obtain profile state information of each eUICC. Herein, the eUICC device may be an electronic device equipped with the eUICC and may be referred to as an eUICC terminal or the like. The eUICC device may include an external electronic device as well as the electronic device 100. Herein, the eUICC device of the user, associated with the user, may be a device of the user, such as the electronic device 300, and a device having the same user account as the electronic device 300.

According to certain embodiments, when a profile state of the eUICC 320 installed in the electronic device 300 is changed due to a profile management operation, the ReDM 330 may store the profile state in a memory (e.g., a memory 130 as shown in FIG. 1) (or a profile list database (DM)) and may deliver the profile state to the eUICC device management server 410.

According to some embodiments, the ReDM 330 may configure instructions to remotely manage a profile included in the eUICC device of the user, associated with the user, and may deliver the instructions to the EUICC device management server 410. For example, the electronic device 300 may enable a specific profile included in an external electronic device of the user through the ReDM 330.

In addition, the operation of the ReDM 330 according to various embodiments is further described with reference to the illustrative examples provided by FIGS. 7 to 22 of this disclosure.

According to various embodiments, the ReDMI 318 may provide communication between the ReDM 330 and the LPA 310. The ReDMI 318 and the ReDM 330 may use an ES7 interface for communication therebetween.

According to certain embodiments, the eUICC device management server 410 may be a server which manages an eUICC device of the user and profile state information of the eUICC device based on user information. According to some embodiments, the eUICC device management server 410 may deliver a request or command (instructions) associated with remote profile management, obtained from the electronic device 300, to manage a profile of an external electronic device.

According to various embodiments, the eUICC device management server 410 may allow the SM-DP+ server 401 to prepare for a profile package through the ES2+ interface. When the ES2+ interface between the SM-DP+ server 401 and the eUICC device management server 410 is not connected, the eUICC device management server 410 may request the MNO to prepare for a profile package through an ES22 interface.

According to certain embodiments, the eUICC device management server 410 may transmit eUICC profile state information and/or eUICC device information (e.g., an eUICC device ID) of each of devices the user registers (or has), through an ES6 interface. Hereinafter, like the description of FIG. 4, when the function of the ReDM 330 is included in an LPA (e.g., the LPA 310 of FIG. 4), an ES13 interface may be used.

Figure 4:
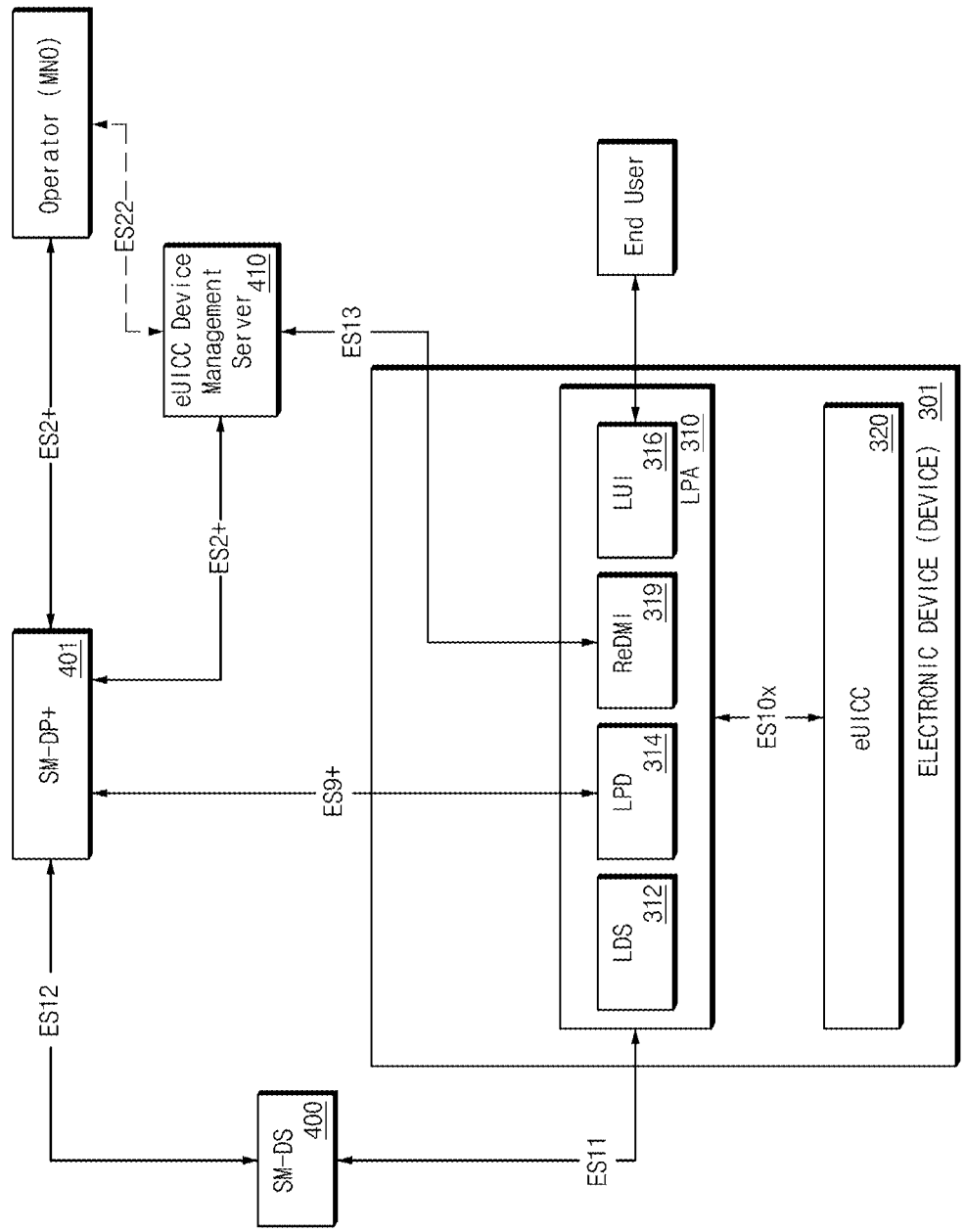
FIG. 4 is a drawing illustrating a network architecture where an electronic device and a server operate, according to certain embodiments.

FIG. 4 illustrates, in block diagram format, a network architecture where an electronic device and a server operate, according to some embodiments.

Referring to the non-limiting example of FIG. 4, a function of an ReDM (for example, ReDM 330 in FIG. 3) may be implemented to be integrated with an LPA 310. An electronic device 301 of FIG. 4 may include an LPA 310 which performs the function of the ReDM.

According to certain embodiments, the LPA 310 (or ReDMI 319) may configure instructions to remotely manage a profile included in an eUICC device of a user, associated with the user, and may deliver the instructions to an eUICC device management server 410, or may obtain profile state information of each of all eUICC devices of the user, associated with the user, registered with the eUICC device management server 410, and profile state information of each eUICC. To this end, the LPA 310 may communicate with the eUICC device management server 410 through an ES13 interface.

In addition, components, such as an SM-DS server 400, an SM-DP+ server 401, the eUICC device management server 410, an eUICC 320, an LDS 312, an LPD 314, or an LUI 316, may be the same or similar to components of FIG. 3, respectively.

Complying with a GSMA technical specification, the electronic device 300 depicted in the non-limiting example of FIG. 3 (or the electronic device 301 of FIG. 4) may be referred to as the expression "device". For the purposes of this disclosure, the terms electronic device and device may be used interchangeably with each other.

Figures 5A, 5B, 5C:
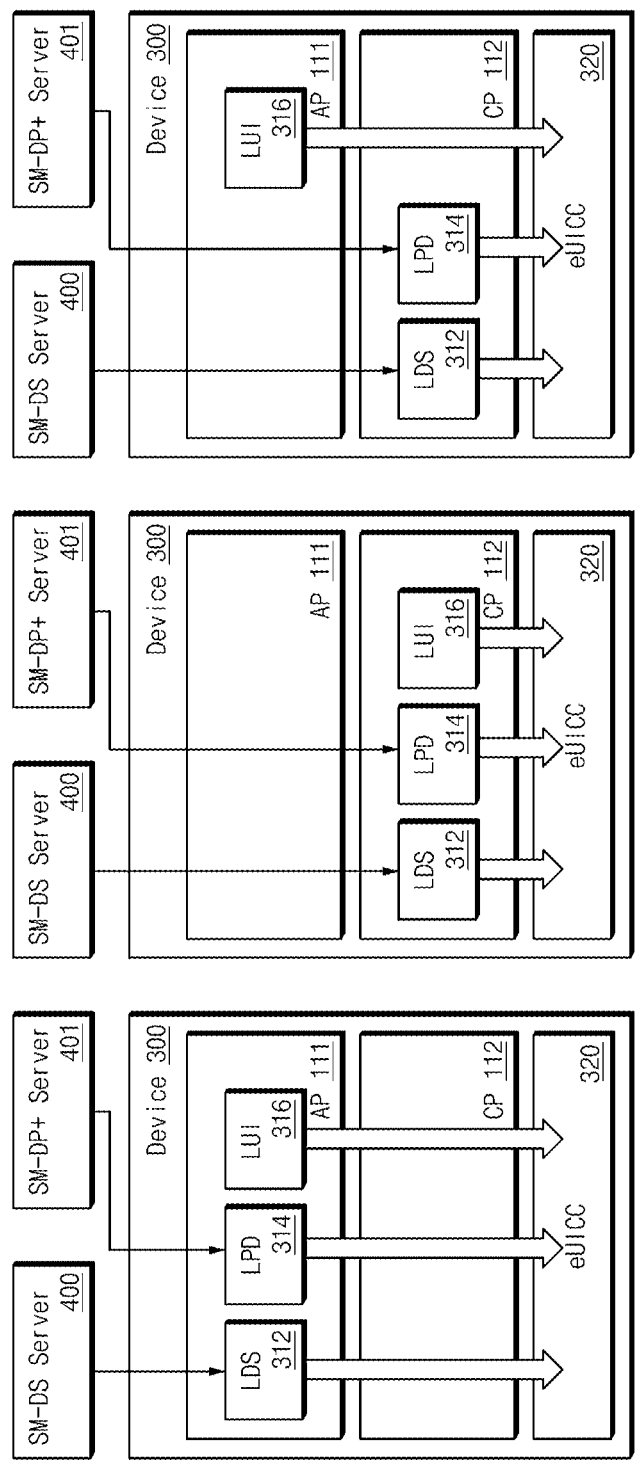
FIG. 5A illustrates an aspect of a method of implementing a local profile assistant (LPA) according to various embodiments.
FIG. 5B illustrates another aspect of a method of implementing a local profile assistant (LPA) according to various embodiments.
FIG. 5C illustrates another aspect of a method of implementing a local profile assistant (LPA) according to various embodiments.

FIGS. 5A to 5C illustrate aspects of implementing an LPA according to various embodiments.

Referring to the non-limiting examples shown in FIGS. 5A to 5C, as shown in FIG. 5A, an LDS 312, an LPD 314, or an LUI 316 of an LPA (e.g., an LPA 310 of FIG. 3) may be implemented by an application processor (AP) 111. Alternatively, as shown in FIG. 5B, the LDS 312, the LPD 314, or the LUI 316 of the LPA (e.g., the LPA 310 of FIG. 3) may be implemented by a communication processor (CP) 112. Alternatively, the LDS 312, the LPD 314, or the LUI 316 of the LPA (e.g., the LPA 310 of FIG. 3) may be implemented by both the AP 111 and the CP 112. For example, as shown in FIG. 5C, a hybrid manner in which the LDS 312 and the LPD 314 are implemented by the CP 112 and in which the LUI 316 is implemented by the AP 111 may be used.

Figure 6:
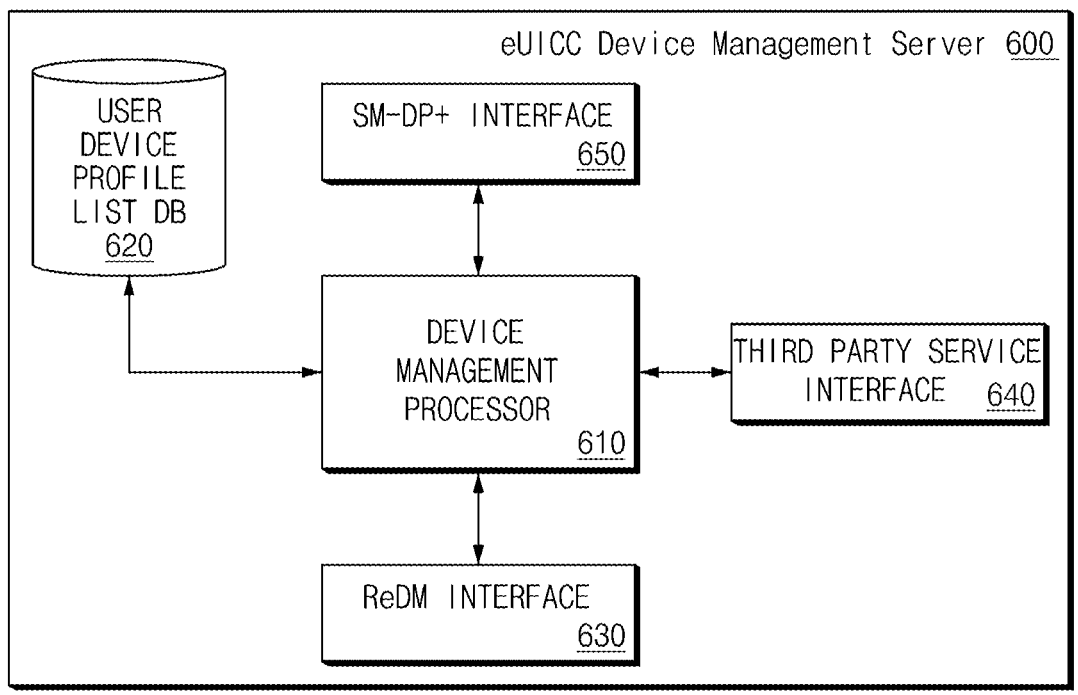
FIG. 6 illustrates, in block diagram format, a configuration of an embedded universal integrated circuit card (eUICC) device management server according to certain embodiments.

FIG. 6 illustrates, in block diagram format, a configuration of an eUICC device management server according to various embodiments.

Referring to the non-limiting example of FIG. 6, an eUICC device management server 600 (e.g., a server 200 of FIG. 2 or an eUICC device management server 410 of FIG. 3 or 4) may include a device management processor 610, a user device profile list DB 620, an ReDM interface 630, a third party service interface 640, or an SM-DP+ interface 650.

According to certain embodiments, the device management processor 610 may perform an operation of an eUICC device management server 410 of FIG. 4. The device management processor 610 may be included in a processor 210 of FIG. 2 or may be included in a separate module.

According to various embodiments, the user device profile list DB 620 may store an eUICC device list and profile state information of a user account transmitted from an electronic device (e.g., an electronic device 100 of FIG. 1) or an external electronic device. According to some embodiments, the eUICC device management server 600 may associate and store an eUICC device with a user account. Such eUICC devices may be referred as eUICC devices of a user. According to certain embodiments, the user device profile list DB 620 may be included in a memory (e.g., a memory 220 of FIG. 2).

Table 1 below represents a format for storing information stored in the user device profile list DB 620.

TABLE 1

| User | Device | EID | Nickname | ICCID | SM-DP + Address | Status |
|---|---|---|---|---|---|---|
| A | Tablet | 890000000000 000000000000 00000001 | Profile 1 | 89000000000 000000011 | | Enable |
| A | | | Profile 2 | 89000000000 000000012 | SMDP. GSMA. COM | Keep |
| A | Smart watch | 890000000000 000000000000 00000003 | Profile 3 | 89000000000 000000031 | — | Enable |
| B | Robotic vacuum cleaner | 890000000000 000000000000 00000002 | Profile 3 | 89000000000 000000012 | — | Keep |
| B | | | Profile 4 | 89000000000 000000022 | — | Enable |

Referring to Table 1 above, a user device profile list DB (e.g., the user device profile list DB 620 of FIG. 6) may store eUICC device information and profile state information for each eUICC device.

To this end, the eUICC device management server 600 may store at least one of user information (or a user account) of an eUICC device, a type of the eUICC device, a secure element identifier (e.g., an eUICC identification (EID)) of the eUICC device, a profile name of the eUICC device, an SM-DP+ address, a profile identifier (e.g., an integrated circuit card identification (ICCID)), or profile state information in the user device profile list DB. The eUICC device management server 600 may associate and store the information.

According to various embodiments, the ReDM interface 630 may be an interface for communicating with an ReDM (e.g., an ReDM 330 of FIG. 3) or an ReDMI (e.g., an ReDMI 319 of FIG. 4) of an LPA (e.g., an LPA 310 of FIG. 3). The ReDM interface 630 may provide an ES13 or ES6 interface.

According to some embodiments, the third party service interface 640 may be an interface for communicating with an MNO (or an MNO of FIG. 3). The third party service interface 640 may include an ES22 interface.

According to certain embodiments, the SM-DP+ interface 650 may be an interface for communicating with an SM-DP+ server (e.g., an SM-DP+ server 401 of FIG. 3). The SM-DP+ interface 650 may include an ES2+ interface.

Figure 7:
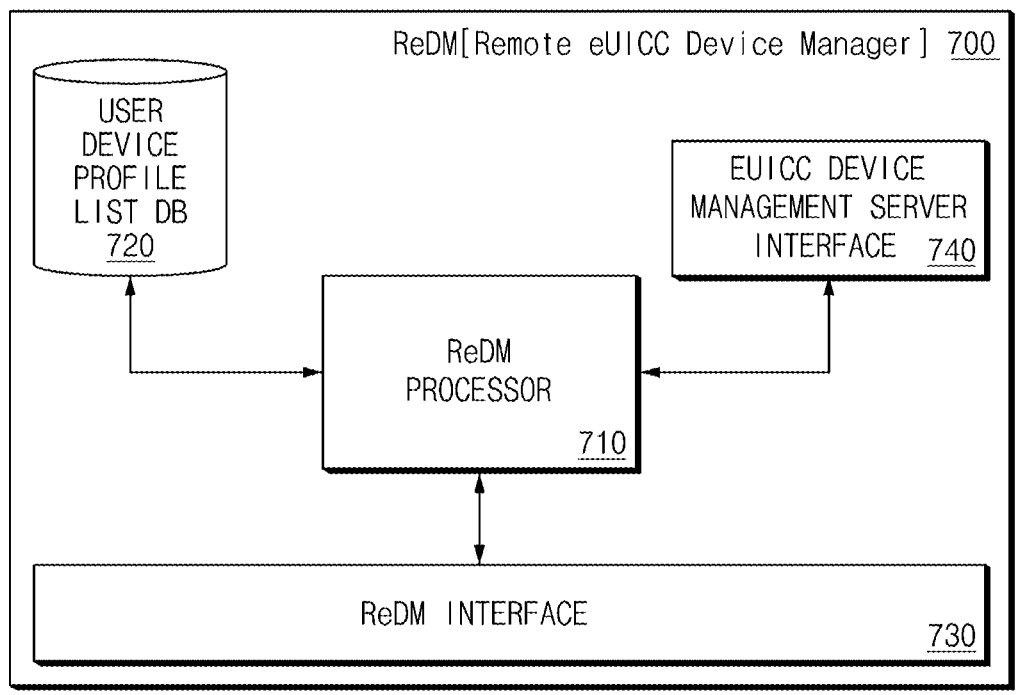
FIG. 7 illustrates, in block diagram format, a configuration of a remote eUICC device manager (ReDM) according to various embodiments.

FIG. 7 illustrates, in block diagram format, a configuration of an ReDM 700 according to various embodiments.

Referring to the non-limiting example of FIG. 7, an ReDM 700 may include at least one of an ReDM processor 710, a user device profile list DB 720, an ReDM interface 730, or an eUICC device management server interface 740.

According to certain embodiments, the ReDM processor 710 may perform an operation of the ReDM (which, according to various embodiments, may be equivalent to ReDM 330 in FIG. 3). The ReDM processor 710 may be included in a processor 110 of FIG. 1 or may be included in a separate module.

According to various embodiments, the user device profile list DB 720 may store a list of all eUICC devices of a user account transmitted from an eUICC device management server (e.g., an eUICC device management server 410 of FIG. 3) and may store profile state information. According to some embodiments, the user device profile list DB 720 may store the list and the profile state information such that the eUICC devices are associated with the user account. According to certain embodiments, the user device profile list DB 720 may be included in a memory (e.g., a memory 130 of FIG. 1).

According to various embodiments, the ReDM interface 730 may be an interface for communicating with an ReDM (e.g., an ReDM 3181 of FIG. 3) of an LPA (e.g., an LPA 310 of FIG. 3).

Table 2 below represents a format of storing information stored in the user device profile list DB 720.

Figure 8:
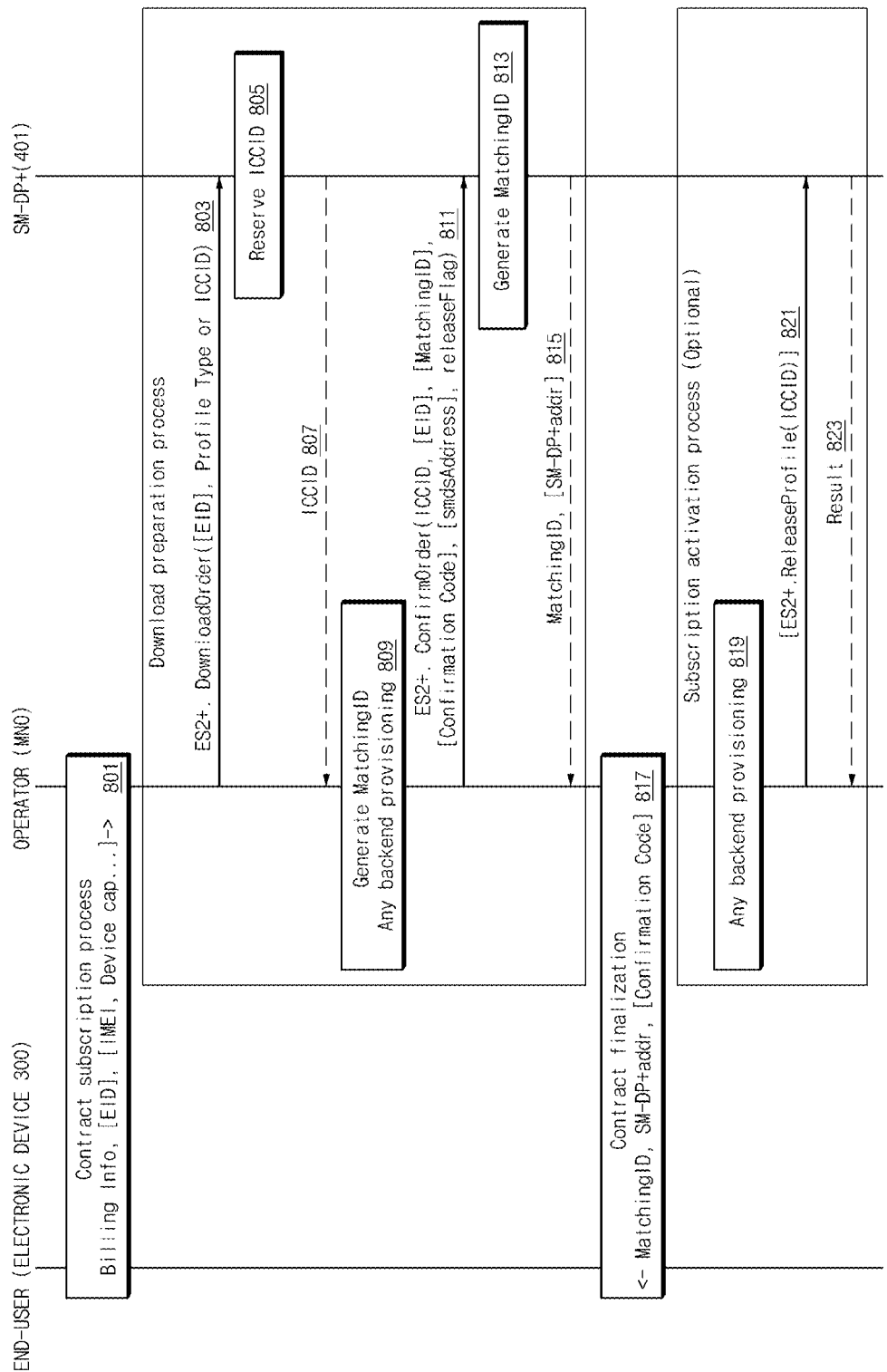
FIG. 8 illustrates a signal sequence of a profile download initiation process according to certain embodiments.

Referring to the non-limiting example of FIG. 8, a contract subscription process, a download preparation process, contract finalization, or a subscription activation process may be performed between an electronic device 300, an SM-DP+ server 401, and an MNO to download a profile.

The processes shown in FIG. 8 may, in certain embodiments, be performed in the electronic device 300 or the SM-DP+ server 401. Alternatively, the processes shown in FIG. 8 may be executed by the SM-DP+ server 401 (e.g., a server 200 of FIG. 2) or an eUICC device management server (e.g., an eUICC device management server 410 of FIG. 3, 15, 18, or 19). For example, profile download initiation may be performed in the SM-DP+ server 401 by the eUICC device management server 410. Each process may be stored in a memory (e.g., a memory 130 of FIG. 1 or a memory 220 of FIG. 2) in the form of instructions and may be executed by a processor.

According to various embodiments, at operation 801, the contract subscription process may be performed between the electronic device 300 and the MNO as follows. The electronic device 300 may transmit billing information, an EID of the electronic device 300, or information about the electronic device 300 to the MNO. The electronic device information may include at least one of, for example, an electronic device identifier (e.g., an international mobile equipment identity (IMEI)) or performance information of the electronic device 300.

TABLE 2

| User | Device | EID | Nickname | ICCID | Status |
|------|--------|-----|----------|-------|--------|
| A | Tablet | 89000000000000000000000000000001 | Profile 1 | 89000000000000000011 | Enable |
| A | | | Profile 2 | 89000000000000000012 | Keep |
| A | Smart watch | 89000000000000000000000000000003 | Profile 3 | 89000000000000000031 | Enable |

Referring to Table 2 above, the user device profile list DB 720 may store eUICC device information and profile state information for each eUICC device.

To this end, an electronic device (e.g., an electronic device 100 of FIG. 1) may store user information (or a user account) of an eUICC device, a type of the eUICC device, an identifier of the eUICC device (e.g., an EID), or a secure element identifier (e.g., an EID) of the eUICC device in the eUICC device or may associate and store a profile name, a profile identifier (e.g., an ICCID), or profile state information, which is kept in an eUICC device management server (e.g., an eUICC device management server 600 of FIG. 6).

According to some embodiments, the ReDM 700 may store profile state information which is not stored in the user device profile list DB 720 of the ReDM 700 and is kept in an external eUICC device management server. For example, referring to Table 2 above, profile 2 may be a profile which is kept in the external eUICC device management server. In this case, since profile 2 is not kept in a specific eUICC device, corresponding eUICC device information may fail to be displayed and may be stored in a "keep" state.

According to certain embodiments, the eUICC device management server interface 740 may communicate with an eUICC device management server. The eUICC device management server interface 740 may provide an ES13 or ES6 interface.

FIG. 8 illustrates a signal sequence of a profile download initiation process according to various embodiments.

Thereafter, the download preparation process may be performed between the MNO and the SM-DP+ server 401. The download preparation process may include some or all of operations 803 to 815.

In operation 803, the MNO may transmit a download order to the SM-DP+ server 401. The download order may include at least one of an EID, a profile type, or an integrated circuit card identification (ICCID). The download order may be transmitted through an ES2+ interface.

In operation 805, the SM-DP+ server 401 may reserve an ICCID. In operation 807, the SM-DP+ server 401 may transmit the ICCID.

In operation 809, the MNO may generate a matching ID and may perform backend provisioning.

In operation 811, the MNO may transmit a configuration order to the SM-DP+ server 401. The confirmation order may include at least one of an EID, the matching ID, a configuration code, a switched multimegabit data service (SMDS) address, or a release flag.

In operation 813, the SM-DP+ server 401 may generate a matching ID. In operation 815, the SM-DP+ server 401 may transmit the matching ID and/or an SM-DP+ address to the MNO.

In operation 817, contract finalization may be performed between the electronic device 300 and the MNO. The MNO may transmit at least one of the matching ID, an SM-DP+ address, or a confirmation code.

In operations 819 to 823, a subscription activation process may be performed between the MNO and the SM-DP+ server 401. Such a process may be an optional process.

In operation 819, the MNO may perform backend provisioning. In operation 821, the MNO may transmit a release profile to the SM-DP+ server 401. In operation 823, the SM-DP+ server 401 may transmit a result to the MNO. In addition, a process about profile download may refer to GSMA standards (e.g., SGP.22 spec version 2.1).

Figure 9:
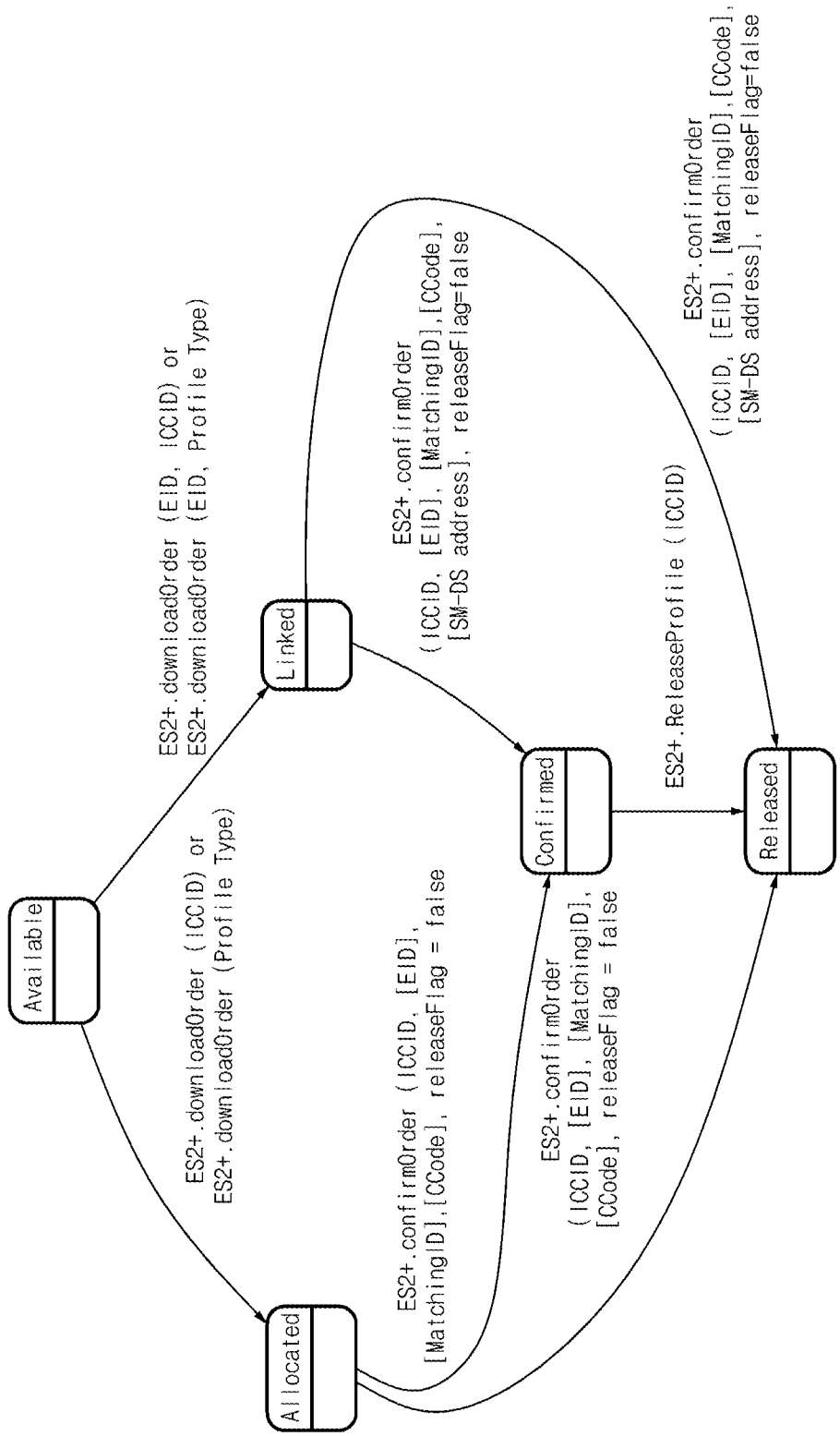
FIG. 9 illustrates a change in a profile state of a subscription manager-data preparation+(SM-DP+) server according to certain embodiments.

FIG. 9 illustrates aspects of a change in profile state of an SM-DP+ server based on an order requested during a profile download initiation process according to certain embodiments.

Referring to the non-limiting example shown in FIG. 9, when an SM-DP+ server (e.g., an SM-DP+ server 401 of FIG. 3) obtains a download order in a state where a profile of the SM-DP+ server is available, the profile may change to an allocated or linked state.

When the SM-DP+ server obtains a configuration order in the allocated or linked state, the profile of the SM-DP+ server may change to a confirmed state based on an information format of the configuration order.

When the SM-DP+ server obtains a release profile in the confirmed state, the profile of the SM-DP+ server may change to a released state. In other words, when profile download initiation proceeds normally, the profile of the SM-DP+ server may be in the released state.

Table 3 below is a table defining a profile state of the SM-DP+ server 401, described in the GSMA SGP. 22 'Spec ver 2.1'.

TABLE 3

| State Name | Description |
| --- | --- |
| Available | The Profile is available in the inventory of the SM-DP+. |
| Allocated | The Profile is reserved for downloading without being linked to an EID. |
| Linked | The Profile is reserved for downloading and is linked to an EID. |
| Confirmed | The Profile is reserved for downloading (linked or not linked to an EID) with Matching ID and Confirmation Code if required. |
| Released | The Profile is ready for download and installation after Network configured by the Operator (e.g., HLR Registration). |
| Downloaded | The Bound Profile was delivered to the LPA. |
| Installed | The Profile was successfully installed on the eUICC. |
| Error | The Profile has not been installed because of one of the following error cases:<br>Confirmation Code Retry Limit exceeded<br>Download Retry Limit exceeded<br>End User Rejection<br>Error during download and installation |
| Unavailable | The Profile cannot be reused anymore by the SM-DP+. |

Figure 10:
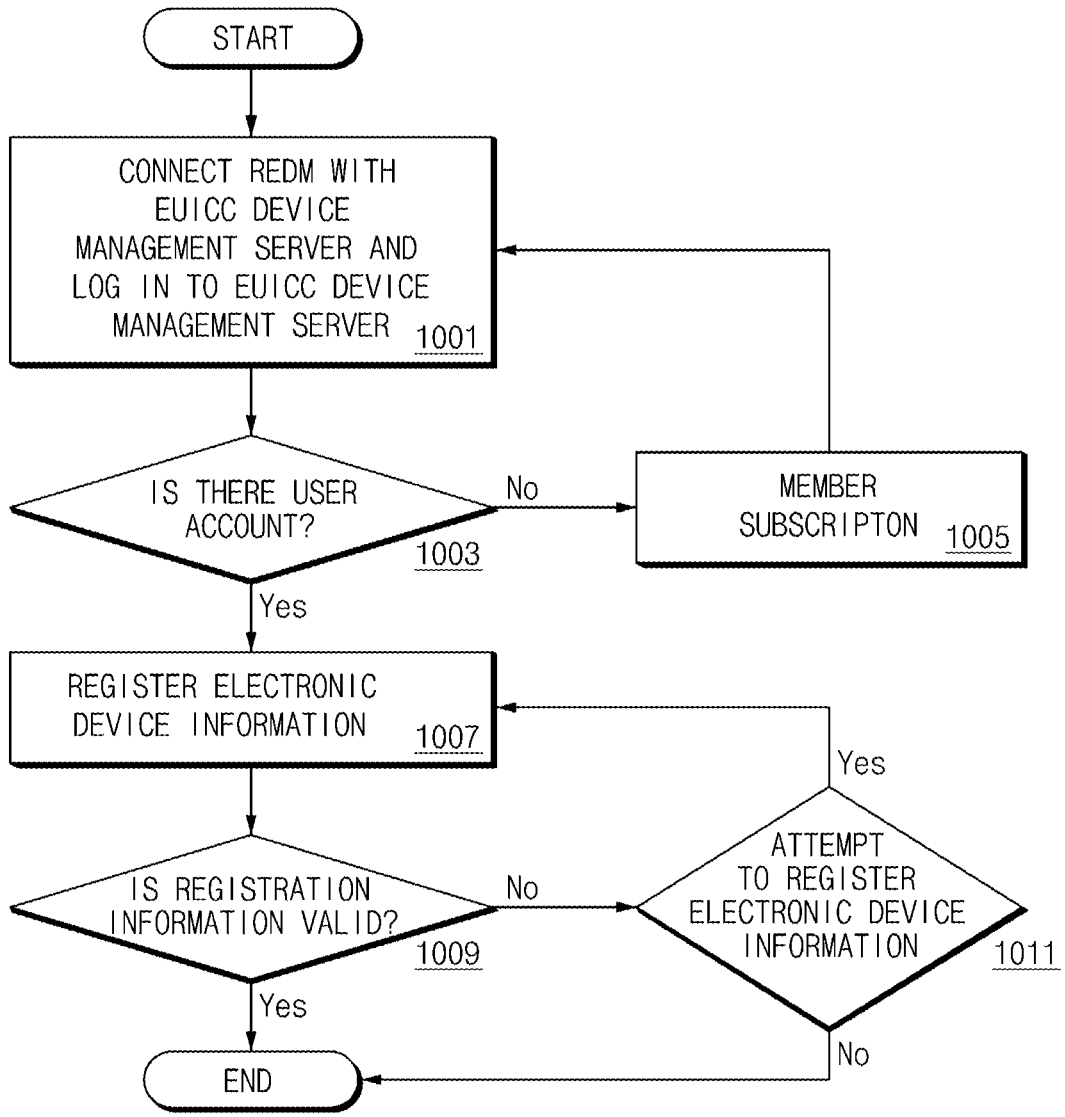
FIG. 10 illustrates operations of a method of registering an electronic device equipped with an eUICC with an eUICC management server according to some embodiments.

FIG. 10 illustrates operations of a method of registering an electronic device equipped with an eUICC with an eUICC management server according to various embodiments.

Operations shown in the non-limiting example of FIG. 10 may be performed by an eUICC device management server (e.g., a server 200 of FIG. 2 or an eUICC device management server 410 of FIG. 3 or 4) or an electronic device (e.g., an electronic device 100 of FIG. 1, an electronic device 300 of FIG. 3, or an electronic device 301 of FIG. 4). Each operation may be stored in a memory (e.g., a memory 130 of FIG. 1 or a memory 220 of FIG. 2) in the form of instructions and may be executed by a processor.

According to some embodiments, a user may register an electronic device of the user, associated with the user, having an eUICC, with the eUICC device management server. The user may refer to the electronic device of the user, associated with the user, having the eUICC, as an eUICC device.

In operation 1001, the electronic device may attempt to access the eUICC device management server. The electronic device may connect an ReDM (e.g., an ReDM 330 of FIG. 3) with the eUICC device management server and may log in to the eUICC device management server. The electronic device may transmit an identifier (e.g., an EID) of a secure element, user account information, and electronic device information to the eUICC device management server to attempt to access the eUICC device management server. According to certain embodiments, the identifier of the secure element may be an identifier of a secure element installed in the electronic device. According to various embodiments, the electronic device information may include at least one of an identifier (e.g., an IMEI) of the electronic device, model information of the electronic device, a name assigned to the electronic device, or a type of the electronic device.

The eUICC device management server may obtain the EID, the user account information, and the electronic device information from the electronic device.

In operation 1003, the eUICC device management server may determine whether the user account information obtained in operation 1001 is registered with the eUICC device management server. When the user account information is not registered, in operation 1005, the eUICC device management server may guide the user to join the eUICC device management server as a member and may generate a user account.

When the user account information is registered, in operation 1007, the eUICC device management server may register an eUICC device based on the ED and the electronic device information. In this case, the ED and the electronic device information may be transmitted to the eUICC device management server when the electronic device initially accesses the eUICC device management server or may be explicitly registered after the user logs in to the eUICC device management server.

In operation 1009, the eUICC device management server may determine whether registration information of the user is valid. For example, the eUICC device management server may verify whether the transmitted EID complies with the GSMA technical specification. Table 4 below represents details defined in GSMA "2.2.2. identification of eUICC of SGP.02 spec: EID". The eUICC device management server may verify whether an EID specifically meets details described in Table 4 below.

TABLE 4

The EID shall always be 32 digits long
The EID shall always be built of
A Major industry identifier digit of 8 ($1^{st}$ digit), as defined in ISO/IEC 7812 [19].
An additional three digits for country code ($3^{rd}$ to $5^{th}$ digits).
If the country code is one digit long, its value shall be prefixed by two digits of 0,
If the country code is two digits long, its value shall be prefixed by one digit of 0.
An additional three digits for issuer identifier ($6^{th}$ to $8^{th}$ digits)
If the issuer identifier is one digit long, its value shall be prefixed by two digits of 0,
If the issuer identifier is two digits long, its value shall be prefixed by one digit of 0.

TABLE 4-continued

An additional ten digits for issuer specific information ($9^{th}$ to $18^{th}$ digits), of which the first five digits ($9^{th}$ to $13^{th}$) contain version information about the platform and OS, to be specified by the issuer and the last five digits ($14^{th}$ to $18^{th}$) contain additional issuer information,
An additional twelve digits for individual identification number ($19^{th}$ to $30^{th}$ digits),
A last two digits ($31^{st}$ to $32^{nd}$ digits) containing check digits calculated over all 32 digits as specified below.
The country code and issuer identifier shall be assigned as specified in ITE E.118 [21]
The two check digits are calculated as follows:
1. Replace the two check digits by two digits of 0,
2. Using the resulting 32 digits as a decimal integer, compute the remainder of that number on division by 97,
3. Subtract the remainder from 98, and use the decimal result for the two check digits,
If the result is one digit long, its value shall be prefixed by one digit of 0.
When stored as a byte string, the first digit shall be put into the highest four bits of the first byte
Annex J provides a description of how the verification of an EID is performed.

When the EID does comply with standards associated with the GSMA (or when the EID is not valid), in operation 1011, the eUICC device management server may guide the user to register the electronic device information again.

When there is no abnormality in the information transmitted for registration, the eUICC device management server may register an eUICC device (e.g., an electronic device 100 of FIG. 1) of the user to finish the registration operation.

Figure 11:
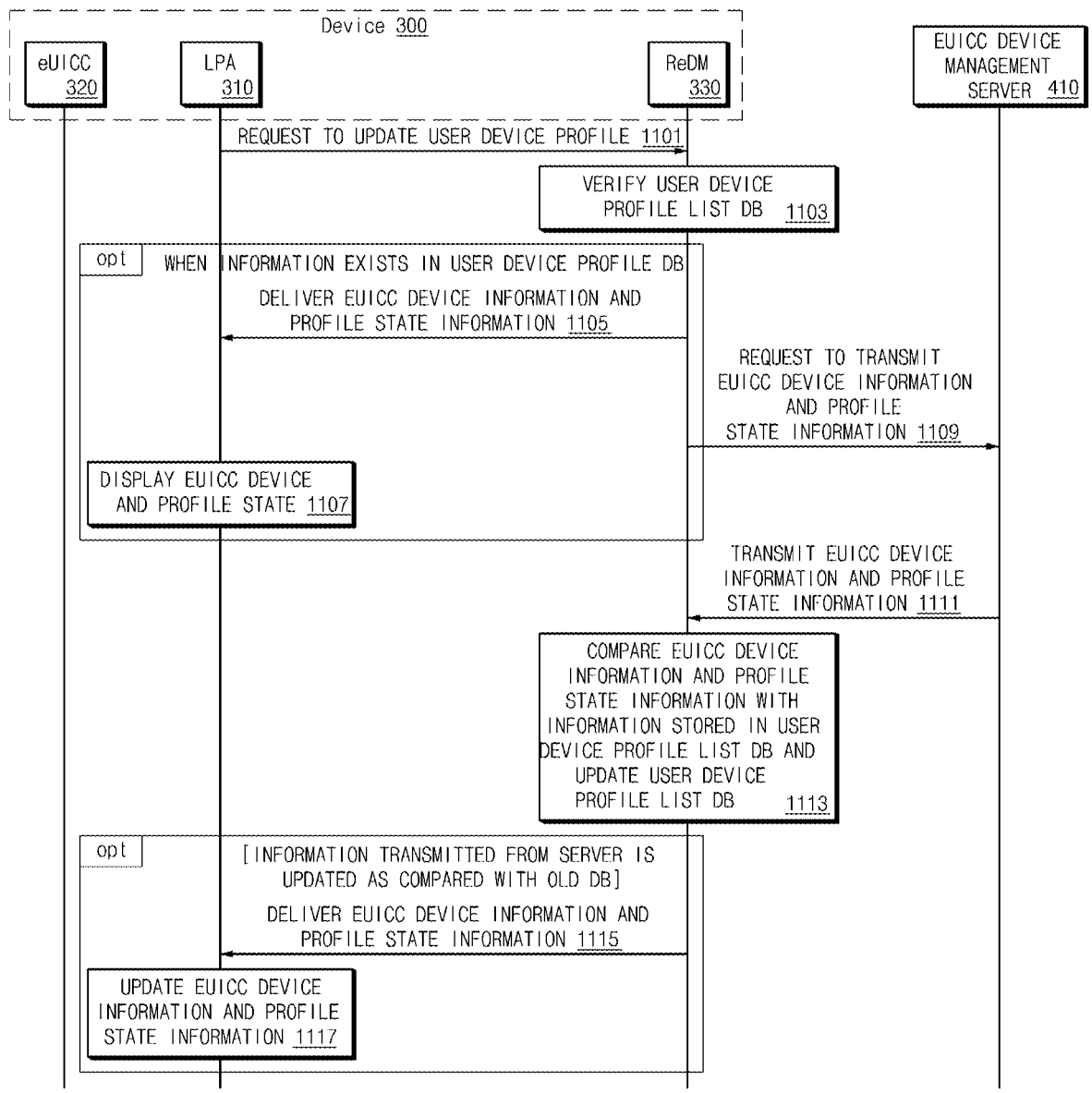
FIG. 11 illustrates a signal sequence associated with a method for delivering eUICC device information and profile state information according to certain embodiments.

FIG. 11 illustrates a signal sequence of a method for delivering eUICC device information and profile state information according to some embodiments.

The non-limiting example of FIG. 11 illustrates operations between an electronic device (or a device) 300 and an eUICC device management server 410 (hereinafter referred to as "server 410") and operations between an eUICC 320, an LPA 310, and an ReDM 330 (or an ReDM, for example ReDMI 319 shown in FIG. 4) in an electronic device 300. According to certain embodiments, each operation below may be performed by a processor or an eUICC 320. The processor may execute instructions stored in a memory for each operation.

The electronic device 300 may request the server 410 to transmit eUICC device information and profile state information and may obtain the information from the server 410. To this end, the server 410 may store eUICC device information or state information associated with each eUICC device. Such information may be obtained from each eUICC device. The eUICC device may include the electronic device 300. Hereinafter, a description will be given of operations between the electronic device 300 and the server 410 and operations in the electronic device 300.

In operation 1101, the LPA 310 may request the ReDM 330 to update a user device profile. When the user executes the LPA 310, the electronic device 300 may perform the operation.

In operation 1103, the ReDM 330 may verify a user device profile list DB. The ReDM 330 may read eUICC device information and profile information, which are stored in the user device profile list DB in the ReDM 330, in response to the request. The profile information may include profile state information about each eUICC device.

Figure 12:
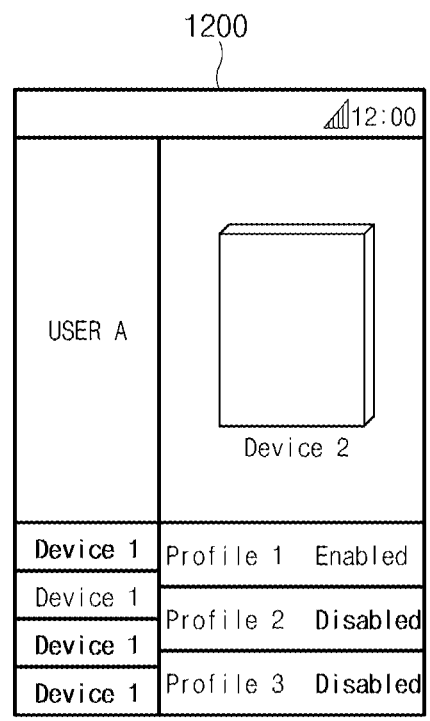
FIG. 12 illustrates a user interface of an electronic device according to certain embodiments.

If there is information in the user device profile database, in operation 1105, the ReDM 330 may deliver eUICC device information and profile state information to the LPA 310. In operation 1107, the LPA 310 may display an eUICC device and a profile state. The eUICC device information may be information of an eUICC device possessed or registered by a user of the electronic device 300. The profile state information may be profile state information about each of eUICC devices. The LPA 310 may display the eUICC device and the profile state on a display (e.g., a display 150 of FIG. 1). FIG. 12 provides a non-limiting example of a screen presented on a display to show a eUICC device and a profile state.

When there is no information in the user device profile database (when there is no history where the electronic device 300 accesses the server 410 and receives eUICC device information and profile state information), operations 1105 and 1107 may fail to be performed and operation 1109 may be performed.

In operation 1109, the ReDM 330 may request the server 410 to transmit eUICC device information and profile state information.

Alternatively, although the ReDM 330 has a user device profile list, it may perform operation 1109 to compare DB information of the ReDM 330 with information of the server 410 to verify whether there are updated contents.

In operation 1111, the server 410 may transmit the eUICC device information and the profile state information to the electronic device 300 (or the ReDM 330) in response to the request. The server 410 may configure eUICC device information of the user and profile state information of each eUICC device based on user account information transmitted from the ReDM 330 and may transmit the eUICC device information and the profile state information to the ReDM 330.

In operation 1113, the ReDM 330 may update the eUICC device information and the profile state information obtained from the server 410. The ReDM 330 may compare information stored in the user device profile list DB with the obtained information. When there are updated contents, the ReDM 330 may update the contents to the user device profile list DB.

When there are updated contents in the user device profile DB, in operation 1115, the ReDM 330 may deliver the eUICC device information and the profile state information to the LPA 310. In operation 1117, profile information of each eUICC device may be updated to the LPA 310. In other words, the LPA 310 may update the information obtained in operation 1115.

When the information obtained from the server 410 is identical to contents stored in the user device profile list DB of the ReDM 330, the ReDM 330 may fail to deliver the eUICC device information and the profile state information of the eUICC device to the LPA 310.

FIG. 12 illustrates a user interface of an electronic device according to various embodiments.

Referring to the non-limiting example of FIG. 12, an electronic device (e.g., an electronic device 100 of FIG. 1, an electronic device 300 of FIG. 3, or an electronic device 301 of FIG. 4) may display a screen 1200 based on a user input. The screen 1200 may include eUICC device information (e.g., device 1, device 2, . . . , device 4) of a user, eUICC device information selected by the user, and profile state information (e.g., enabled, disabled, and the like) of the selected eUICC device. To this end, as described in Table 2 above, the electronic device may store eUICC device information and profile state information for each eUICC device.

According to some embodiments, the user interface shown in FIG. 12 may display a profile which is in a "keep" state, other than a profile stored in an eUICC device. In this case, the screen 1200 may display a profile and profile state information. In this case, the profile state information may represent a "keep" state. The user may know a kept profile through the user interface and may remotely manage the profile. For example, the electronic device may install the kept profile based on a user input.

Figure 13:
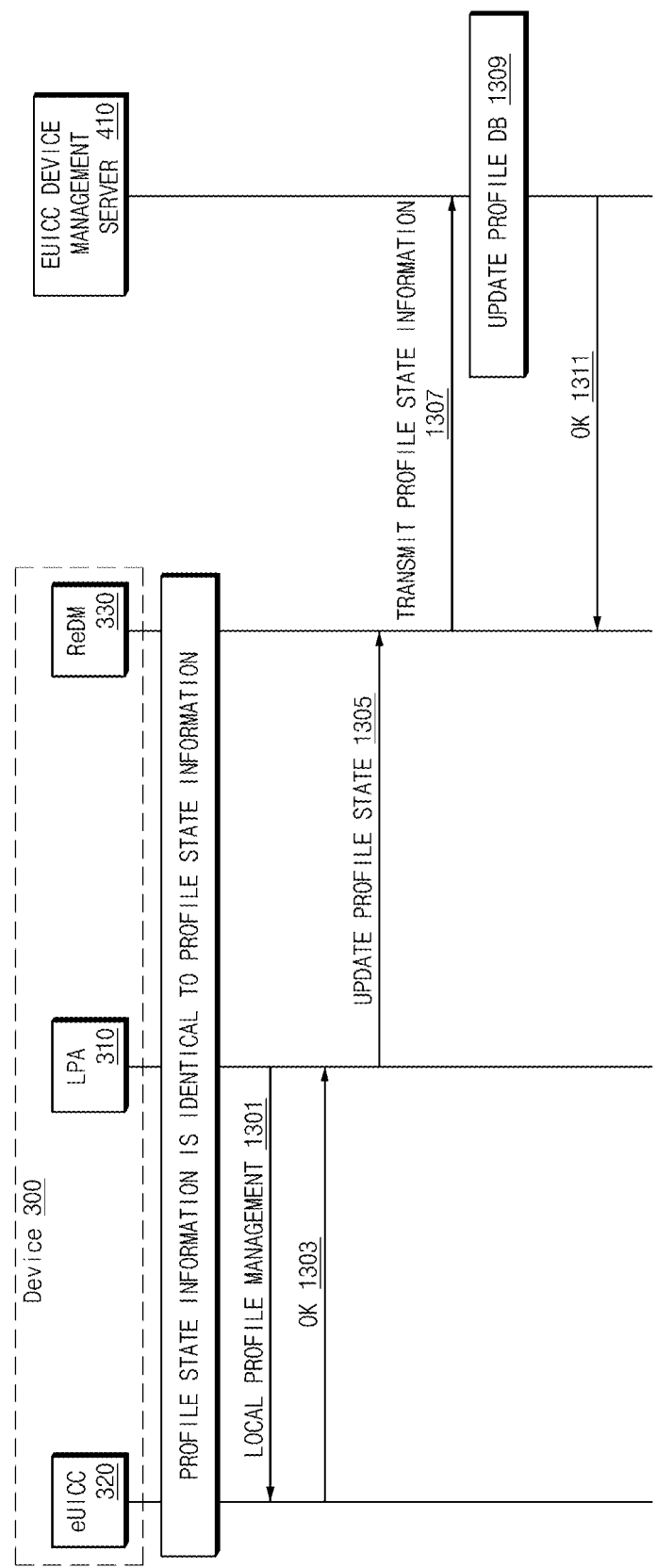
FIG. 13 illustrates a signal sequence associated with updating profile state information of an electronic device to an eUICC device management server according to various embodiments.

FIG. 13 illustrates a signal sequence of an operation of updating profile state information of an electronic device to an eUICC device management server according to certain embodiments.

The non-limiting example of FIG. 13 illustrates operations between an electronic device (or a device) 300 and an eUICC device management server 410 (hereinafter referred to as "server 410") and operations between an eUICC 320, an LPA 310, and an ReDM 330 in an electronic device 300. According to various embodiments, each operation below may be performed by a processor or an eUICC 320. The processor may execute instructions stored in a memory for each operation.

As shown in the non-limiting example of FIG. 13, the electronic device 300 may update its profile state to an eUICC device management server. When the profile state is changed, the electronic device 300 may transmit a profile change state to the server 410 to synchronize a profile state between the electronic device 300 and the server 410. Such an operation may be performed by an eUICC device(s) of a user. The server 410 may obtain information of each eUICC device and profile state information of each eUICC device.

According to some embodiments, a profile state of the eUICC 320 and a profile state of the electronic device 300, stored in a user device profile list DB of the ReDM 330 may be identical to each other.

In operation 1301, the LPA 310 may perform a local profile management operation. Such an operation may be an operation defined in the GSMA technical specification (e.g., an operation of enabling, disabling, deleting, or adding a profile) or an operation described in embodiments below (e.g., an operation of keeping or transferring a profile). The LPA 310 may perform operation 1301 in response to an input (or a command) of the user. According to certain embodiments, the user may select a local profile management operation through a screen (for example, screen 1200 shown in FIG. 12).

According to various embodiments, the LPA 310 may deliver a command or request associated with local profile management to the eUICC 320. The eUICC 320 may execute an operation for the command or request.

In operation 1303, the LPA 310 may obtain the result (OK) of the local profile management operation from the eUICC 320. The eUICC 320 may deliver the executed result to the LPA 310.

When the local profile management operation is normally processed, in operation 1305, the LPA 310 may deliver the result of executing the local profile management to the ReDM 330. In other words, the LPA 310 may update the profile state to the ReDM 330.

In operation 1307, the ReDM 330 may transmit the executed result to the server 410. The ReDM 330 may transmit the changed profile state information to the server 410. In this case, the information transmitted to the server 410 may include at least one of a user account, an identifier (e.g., an EID) of the electronic device, an identifier (e.g., an ICCID) of the profile, or a profile state.

In operation 1309, the server 410 may update a profile DB (e.g., a user device profile list DB 620 of FIG. 6) based on the information obtained from the ReDM 330.

In operation 1311, the server 410 may transmit the result executed in operation 1309 to the ReDM 1330.

Figure 14:
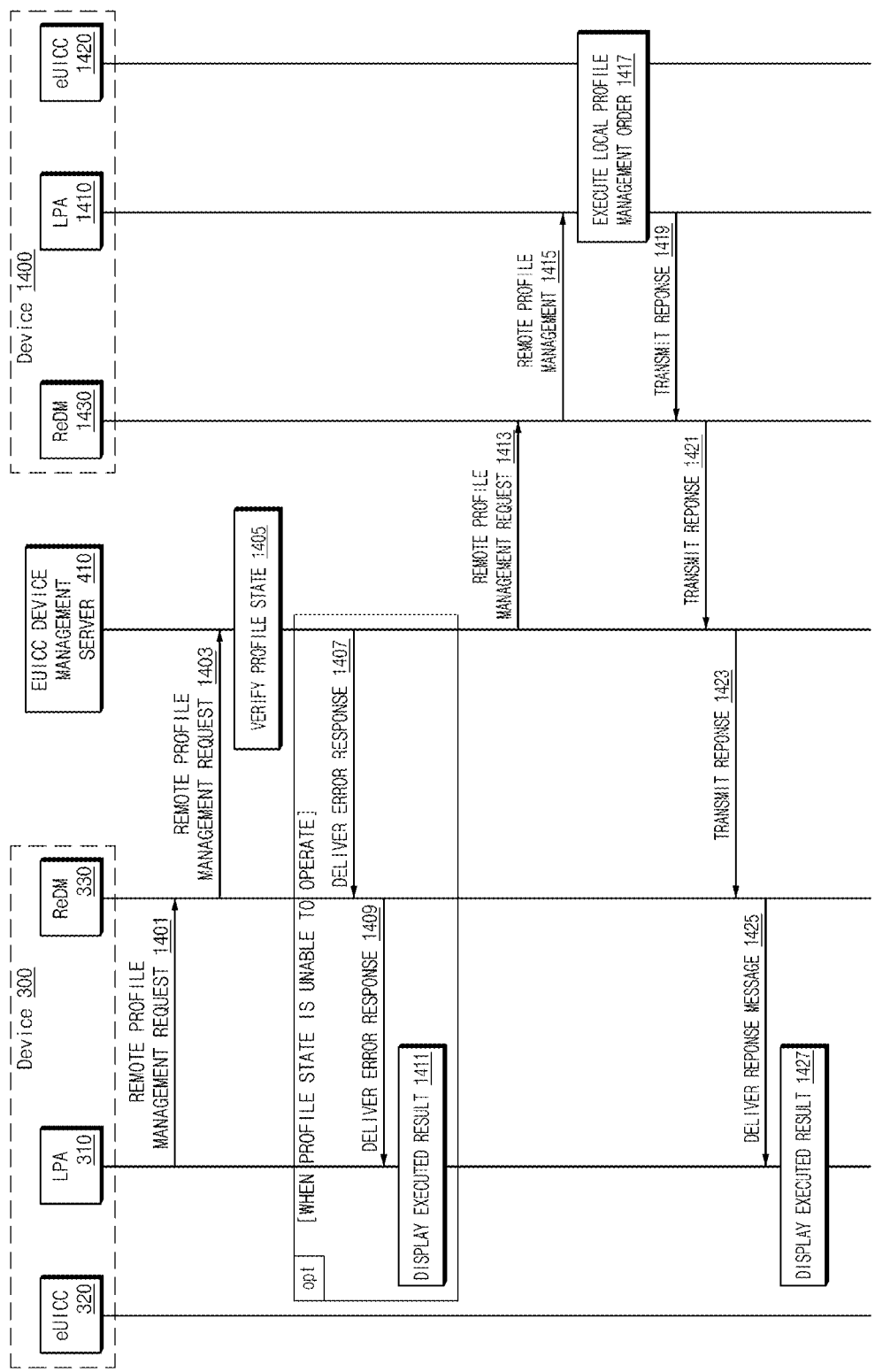
FIG. 14 illustrates a signal sequence associated with an operation in which an electronic device remotely manages a profile of an external electronic device according to certain embodiments.

FIG. 14 illustrates a signal sequence of an operation in which an electronic device remotely manages a profile of an external electronic device according to some embodiments.

The non-limiting example of FIG. 14 illustrates operations between an electronic device (300, an eUICC device management server 410 (hereinafter referred to as "server 410"), and an external electronic device 1400, operations between an eUICC 320, an LPA 310, and an ReDM 330 in the electronic device 300, and operations between an eUICC 1420, an LPA 1410, and an ReDM 1430 in the external electronic device 1400. According to certain embodiments, each operation below may be performed by a processor or an eUICC (for example, eUICC 320 in FIG. or eUICC 1420 in FIG. 14). The processor may execute instructions stored in a memory for each operation.

According to various embodiments, the external electronic device 1400 may include the same or similar components to an electronic device 100 of FIG. 1, an electronic device 300 of FIG. 3, or an electronic device 301 of FIG. 4. For example, the eUICC 1420 may be the same or similar to eUICC 320 described with reference to FIGS. 3 and 4. The LPA 1410 may be the same or similar to an LPA 310 of FIG. 3 or 4. The ReDM 1430 may perform the same or similar operation to an ReDM 330 of FIG. 3, an ReDMI 319 of FIG. 4, or an ReDM 700 of FIG. 7.

According to some embodiments, the electronic device 300 may manage a profile of the external electronic device 1400 as well as its profile. Hereinafter, such an operation may be referred to as remote profile management.

The electronic device 300 may obtain an input for profile management of a user. According to certain embodiments, the user may select a profile management operation for another device (a remote profile management operation). The electronic device 300 may obtain a user input through the LPA 310. For example, the remote profile management operation may be an operation of enabling, disabling, deleting, adding, or transferring a profile.

In operation 1401, the LPA 310 may deliver a request associated with remote profile management selected by the user to the ReDM 330.

In operation 1403, the ReDM 330 may transmit a request associated with the remote profile management to a server 410. To this end, the ReDM 330 may generate a message in response to the request obtained from the LPA 310. The message may include at least one of a user account, an identifier (e.g., an EID) of an eUICC 320 (hereinafter referred to as "first EID") installed in the electronic device 300 which transmits an instruction, an identifier (e.g., an EID) of an eUICC (e.g., the eUICC 1420) (hereinafter referred to as "second EID") installed the external electronic device 1400 which receives the instruction, a triggered local profile management type, or an identifier (e.g., an ICCID) of a profile (hereinafter referred to as "ICCID") to which a local profile management operation is applied.

In operation 1405, receiving the request associated with the remote profile management, the server 410 may verify a state of a corresponding profile. The server 410 may verify whether the command (or request) delivered in operation 1403 is able to be processed. For example, when a profile which is a target of a remote command is currently enabled and when an operation for delivered remote profile management is enabled, the server 410 may fail to need to process a corresponding operation.

When the delivered command is unable to be processed, operations 1407 to 1411 may be performed.

As shown in the non-limiting example of FIG. 14, operation 1407, the server 410 may transmit a response message together with an error cause to the ReDM 330. In operation 1409, the ReDM 330 may deliver the error response to the LPA 310. In operation 1411, the LPA 310 may display the result of executing the remote profile management on a display (for example, display 150 of FIG. 1). In this case, the displayed executed result may indicate the failure or error of the management.

When the delivered command is able to be processed, in operation 1413, the server 410 may transmit a request (or command) associated with remote profile management to the external electronic device 1400. The external electronic device 1400 may obtain a message for the remote profile management through the ReDM 1430. The message may include at least one of a first EID, a second EID, a triggered local profile management type, a local profile management parameter, or an ICCID of a profile to which a local profile management operation is applied.

According to various embodiments, at operation 1415, in response to the request associated with the remote profile management, the ReDM 1430 may deliver the local profile management to the LPA 1410. The ReDM 1430 may change the remote profile management to the local profile management.

In operation 1417, in response to the local profile management, the LPA 1410 may perform a profile management operation for the EUICC 1420 in the external electronic device 1500. The LPA 1410 may deliver a local profile management command to the eUICC 1420. The eUICC 1420 may execute a profile state change in response to the local profile management command. The operation of the profile state change of the eUICC 1420 may comply with GSMA standards or a profile state change operation defined below.

In operation 1419, the LPA 1410 may deliver the result of performing the profile management operation to the ReDM 1430.

In certain embodiments, at operation 1421, the ReDM 1430 of the external electronic device 1400 may transmit a response associated with the profile management to the server 410. The ReDM 1430 may configure the response to include at least one of a first EID, a second EID, or a result of executing remote profile management.

In operation 1423, the server 410 may transmit a response associated with the profile management to the ReDM 330 of the electronic device 300. In operation 1425, the ReDM 330 may deliver a response message to the LPA 310. The LPA 310 may display the remote profile management operation such that the user verifies the remote profile management operation. For example, the LPA 310 may display a profile state of the external electronic device 1400 or a result of executing a profile.

Figure 15:
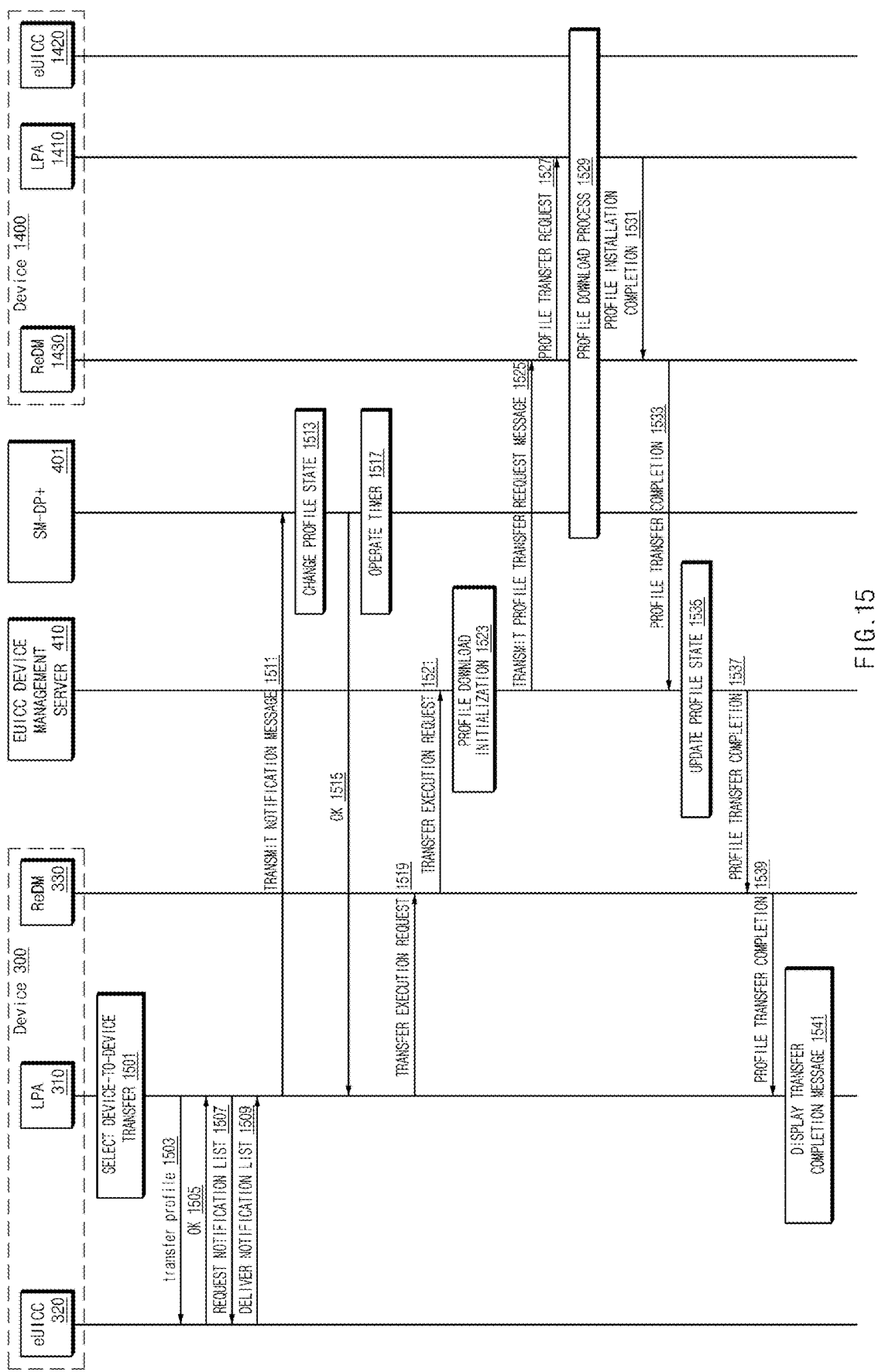
FIG. 15 illustrates a signal sequence of a method in which an electronic device transmits a profile to an external electronic device according to certain embodiments.

FIG. 15 illustrates a signal sequence of a method in which an electronic device delivers a profile to an external electronic device according to various embodiments.

The non-limiting example of FIG. 15 illustrates operations between an electronic device (or a device) 300, an eUICC device management server 410 (hereinafter referred to as "server 410"), an SM-DP+ server 401, and an external electronic device 1400, operations between an eUICC 320, an LPA 310, and an ReDM 330 in the electronic device 300, and operations between an eUICC 1420, an LPA 1410, and an ReDM 1430 in the external electronic device 1400. According to some embodiments, each operation below may be performed by a processor or an eUICC 320 or 1420. The processor may execute instructions stored in a memory for each operation.

According to certain embodiments, the electronic device 300 may transfer a profile of the electronic device 300 to the external electronic device 1400. Such an operation may be defined as one of a set of profile management operations.

According to various embodiments, at operation 1501, the electronic device 300 may obtain an input for device-to-device transfer of a profile of a user. According to various embodiments, the user may select a profile to be transmitted to the external electronic device 1400. The electronic device 300 may obtain a user input through the LPA 310. According to some embodiments, the electronic device 300 may obtain a selection for a specific external electronic device and a selection for a specific profile among profiles of the electronic device 300, through a screen 1200 shown in FIG. 12. For example, the electronic device 300 may obtain a drag (drag and drop) operation to the external electronic device 1400 of the specific profile or may obtain a selection for a transfer menu provided for a profile, and may explicitly trigger transmission.

In operation 1503, the LPA 310 may deliver a transfer profile command to the eUICC 320 with respect the selected profile. The transfer profile command may be defined as local profile management.

The transfer profile command may have the following characteristics a) to d).

a) When the LPA 310 delivers a "transfer profile" command to the eUICC 320, it delivers an ICCID or an issuer security domain profile application identifier (ISD-P AID) to notify the eUICC 320 what a profile to be transmitted is.

b) Receiving the "transfer profile" command, the eUICC 320 may delete the profile from a memory not to show the profile to the user anymore. In other words, although an ES10c.GetProfilesInfo( ) command defined in the GSMA technical specification is executed, the profile may fail to be included and transferred in a profile list.

c) The eUICC 320 may perform the "transfer profile" command and may then generate a notification for "transfer profile".

d) When the transfer profile notification is transmitted to the SM-DP+ server 401, the SM-DP+ server 401 may change a state of the profile to a "transferable" state.

As such, transferring the profile may be changing a profile state of the SM-DP+ server 401 to transfer the profile. As defined in Table 5 below, the "transferable" state may be added to Table 1 above.

TABLE 5

Transferable: in a state, such as an available state, where profile download initiation is possible, a download preparation process is performed through an eUICC device management server in the state.

In operation 1505, after the transfer profile command is performed, the eUICC 320 may deliver a response to the command to the LPA 310. Thereafter, the eUICC 320 may generate a notification list for the delivery.

In operation 1507, the LPA 310 may request the eUICC 320 to deliver the notification list. In operation 1509, the eUICC 320 may deliver the notification list to the LPA 310 in response to the request.

Table 6 below may represent a notification event used when the LPA 310 requests the eUICC 320 to deliver the notification list. The notification event may include information "notificationtransfer" associated with transfer of a profile defined in Table 6 below.

TABLE 6

```
NotificationEvent ::= BIT STRING {
  notificationInstall(0),
  notificationEnable(1),
  notificationDisable(2),
  notificationDelete(3),
  notificationTransfer(4),
  notificationKeep(5) }
```

In operation 1511, the LPA 310 may transmit a notification message to the SM-DP+ server 401. The notification message may be a message of providing a notification that a profile state of the eUICC 320 is "transferable".

In operation 1513, the SM-DP+ server 401 may change a state of the profile to a "transferable" state in response to the notification message. In operation 1515, the SM-DP+ server 401 may transmit a response message to the notification message to the LPA 310.

In operation 1517, the SM-DP+ server 401 may operate a timer. When the state of the profile is changed, the SM-DP+ server 401 may operate the timer. According to certain embodiments, the timer may be for verifying a time taken to receive a profile download initiation request for transfer of a profile. Before the timer expires, a profile download initiation process does not proceed as shown in FIG. 8, the SM-DP+ server 401 may determine the transfer request as being fail and may deliver a transfer error message to the LPA 310. A detailed description may refer to a description reference to FIG. 16.

Operations 1517 and 1515 may be simultaneously performed, or any one of operations 1517 and 1515 may first be performed.

In operation 1519, successfully receiving the response message of operation 1515, the LPA 310 may deliver a transfer execution request to the ReDM 330.

In operation 1521, the ReDM 330 may transmit the transfer execution request to the server 410 in response to the transfer execution request. The ReDM 330 may generate a message for transfer execution and may transmit the message for the transfer execution to the server 410. The message may include at least one of a user account, a first ED, a second EID, an ICCID of a transferred profile, or an SM-DP+ address extracted from the notification message.

In operation 1523, the server 410 may execute a profile download initiation process with the SM-DP+ server 401 based on the obtained message for the transfer execution. The profile download initiation process may refer to a description with reference to FIG. 8. When the profile download initiation process starts, the SM-DP+ server 401 may end the timer according to operation 1517. When the profile download initiation process is successfully performed, a state of the transferred profile may change to a released state. The change in the state of the profile may, in certain embodiments, be described with reference to FIG. 9 and the description thereof in the present disclosure.

According to various embodiments, at operation 1525, the server 410 may transmit a profile transfer request message to the external electronic device 1400. The server 410 may configure a message based on a manner to generate a profile in the profile download initiation process and may transmit the message to the ReDM 1430 of the external electronic device 1400. The message may be configured with a transfer type and/or an activation code.

According to various embodiments, the transfer type may vary with a manner that the SM-DP+ server 401 generates a profile. For example, when a profile download use case is SM-DS, the transfer type may be SM-DS. When the profile download use case is default SM-DP+, the transfer type may be SM-DP+. When the profile download use case is an activation code, the transfer type may be the activation code. An activation code value in the message may be delivered together only when the transfer type is the activation code, otherwise, it may be delivered as "empty".

In operation 1527, the ReDM 1430 may deliver a profile transfer request to the LPA 1410 in response to the profile transfer request message. The ReDM 1430 may trigger a "profile add" command of the LPA 1410 based on the profile transfer request message. For example, when a transfer type of the profile transfer request message is SM-DS, the LPA 1410 may perform a profile download process using an SM-DS server (e.g., an SM-DS server 400 of FIG. 3). The "profile add" command may comply with GSMA standards.

In operation 1529, the LPA 1410 may perform the profile download process. The profile download process may be performed between the LPA 1410 and the SM-DP+ server 401. The profile download process may refer to a GSMA standard document (e.g., GSMA "SGP.22 spec version 2.1").

When the installation of the profile is completed, in operation 1531, the LPA 1410 may deliver the result of providing a notification that the installation of the profile is completed to the ReDM 1430. In operation 1533, the ReDM 1430 may transmit the result to the server 410. The result transmitted to the server 410 may indicate that transfer of the profile is completed.

In operation 1535, the server 410 may update a state of the profile. In operation 1537, the server 410 may deliver the result obtained in operation 1533 to the electronic device 300 (or the ReDM 330) which transfers the profile. For example, the server 410 may transmit a profile transfer completion message to the electronic device 300.

In operation 1539, the ReDM 330 of the electronic device 300 may deliver the result (or the profile transfer completion message) to the LPA 310. In operation 1541, the LPA 310 may display the result. For example, the LPA 310 may display the profile transfer completion message. Thus, the user may know the result of transferring the profile.

Figure 16:
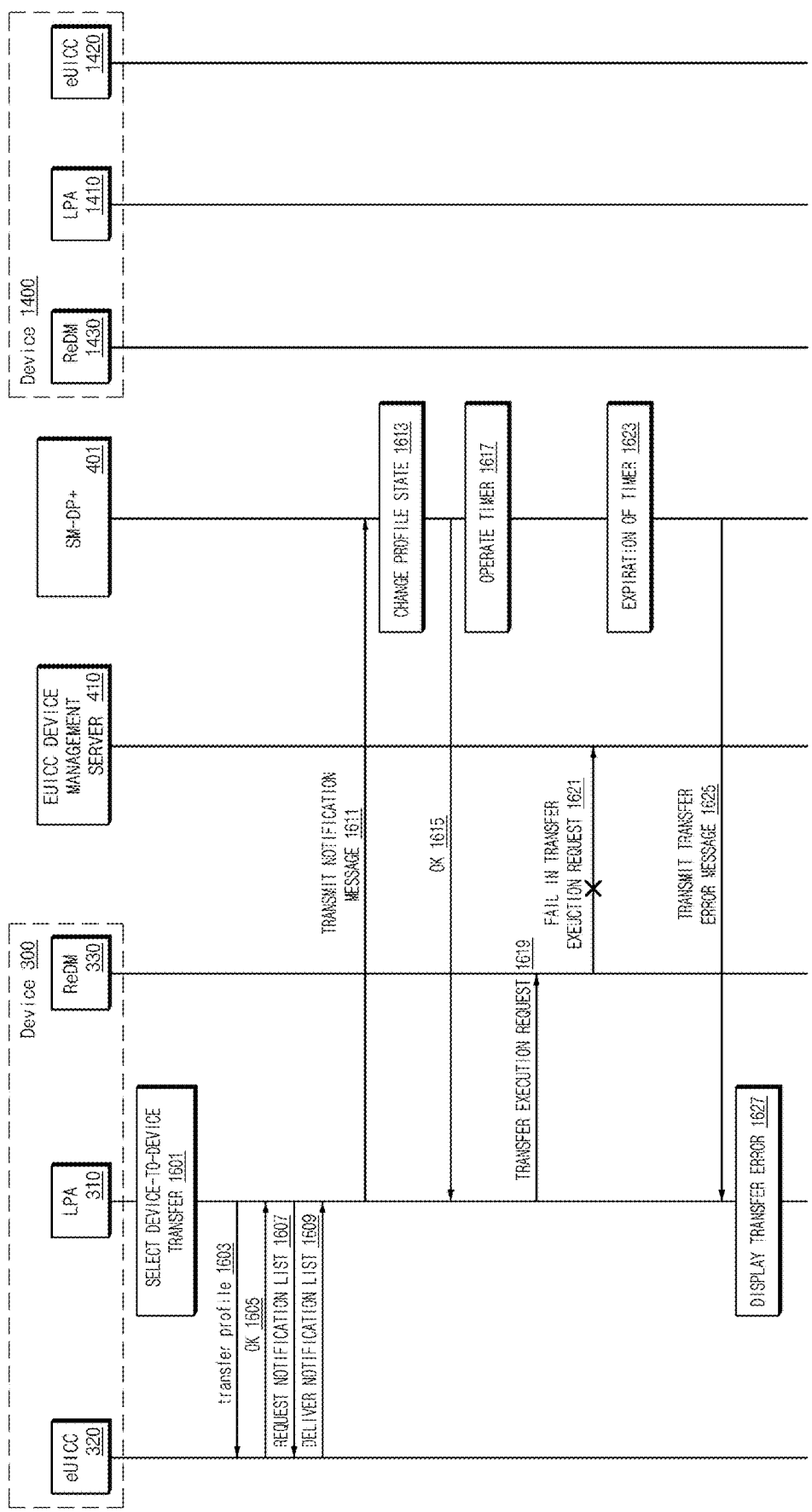
FIG. 16 illustrates a signal sequence of an operation of an electronic device when a download initiation process is not successfully performed before a timer expires, according to some embodiments.

FIG. 16 illustrates a signal sequence of an operation of an electronic device when a download initiation process is not successfully performed before a timer expires in FIG. 15, according to some embodiments.

The non-limiting example of FIG. 16 illustrates operations between an electronic device (or a device) 300, an eUICC device management server 410 (hereinafter referred to as "server 410"), an SM-DP+ server 401, and an external electronic device 1400, operations between an eUICC 320, an LPA 310, and an ReDM 330 in the electronic device 300, and operations between an eUICC 1420, an LPA 1410, and an ReDM 1430 in the external electronic device 1400. According to certain embodiments, each operation below may be performed by a processor or an eUICC 320 or 1420. The processor may execute instructions stored in a memory for each operation.

According to various embodiments, when execution of profile transfer is fail while transfer of a profile is executed, the electronic device 300 may perform operations below.

Operations 1601 to 1619 may be the same or similar to operations 1501 to 1519 of FIG. 15, respectively.

In operations 1621 and 1623, the server 410, the SM-DP+ server 401, or the electronic device 300 may determine that transfer execution of the profile is fail. For example, a download initiation process does not proceed until a time expires, or when an error occurs in access to a network, or when the electronic device 300 is ended, the server 410, the SM-DP+ server 401, or the electronic device 300 may determine that the transfer execution is fail.

When the timer expires, the SM-DP+ server 401 may transmit a transfer error message to the server 410. In this case, the transfer error message may include an identifier (e.g., an ICCID) of the profile, transfer of which is fail. The transfer error message may further include a profile name (or nickname). Transmission of the profile name may be optional.

In operation 1625, the server 410 may deliver the transfer error message to the LPA 310 of the electronic device 300. According to some embodiments, the transfer error message may be delivered to the LPA 310 via the ReDM 330.

In operation 1627, the LPA 310 may display that an error occurs in transfer in response to the delivered error message. In this case, the displayed contents may refer to FIG. 17.

Figure 17:
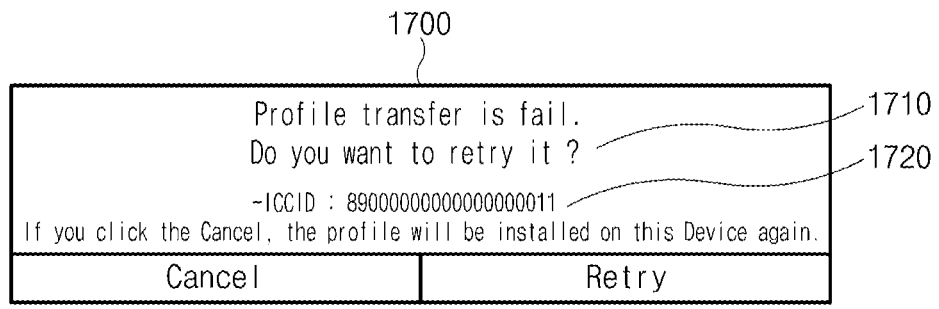
FIG. 17 illustrates a user interface when a profile transfer fails according to certain embodiments.

FIG. 17 illustrates a user interface presented in response to a profile transfer failure, according to certain embodiments.

Referring to the non-limiting example of FIG. 17, when a user input for instructing to transfer a profile fails to effect the requested transfer, an electronic device (e.g., an electronic device 100 of FIG. 1) may display a screen 1700 for providing a notification that the transfer failed on a display (e.g., a display 150 of FIG. 1). The screen 1700 may include a message 1710 for providing the notification that the transfer has failed. The screen 1700 may be displayed as a popup display. The message 1710 may include a message for verifying whether to retry and an item for selecting "retry" or "cancel". According to various embodiments, the message 1710 may further include an identifier 1720 (e.g., an ICCID) of a profile which attempted to be transferred.

Figure 18:
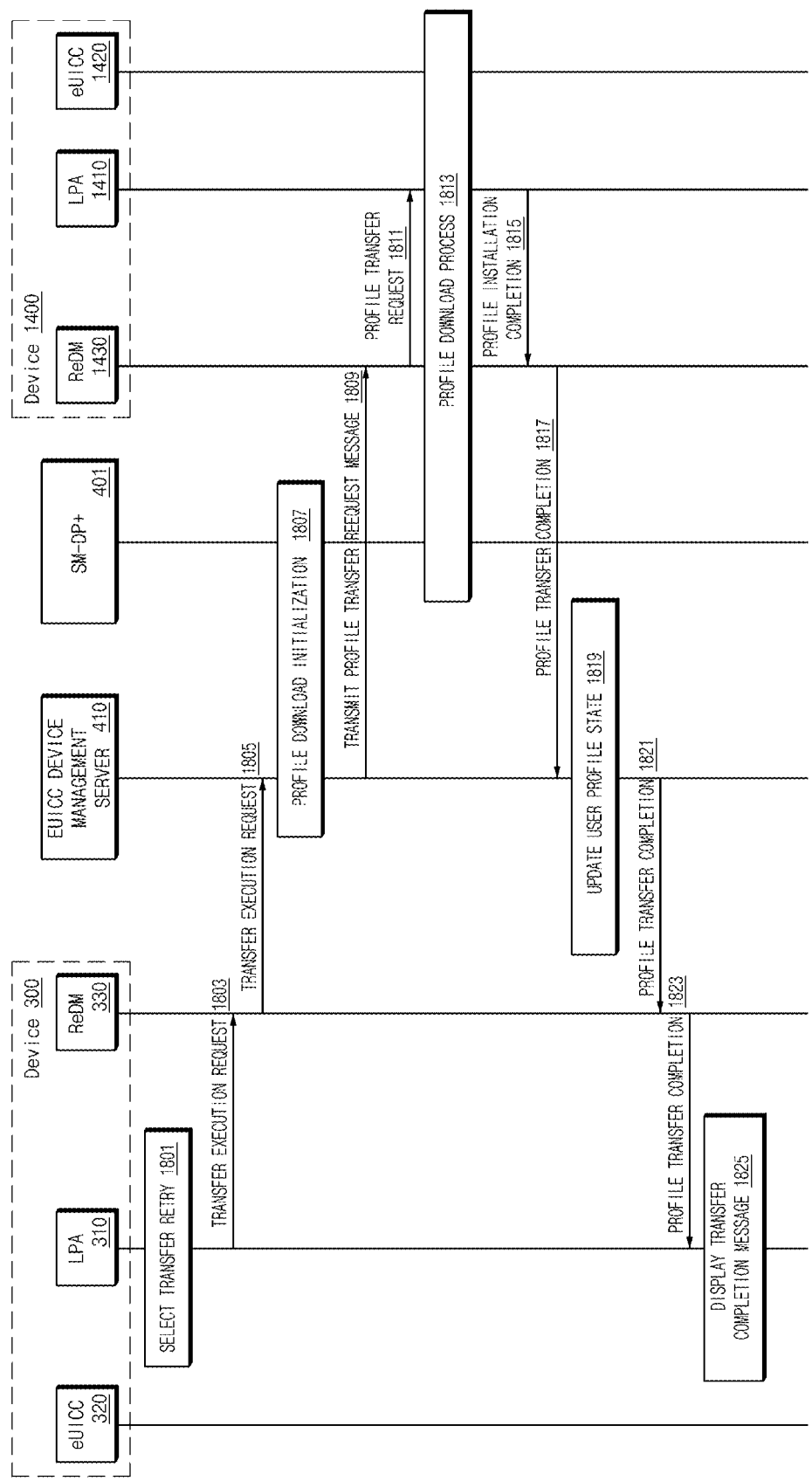
FIG. 18 illustrates a signal sequence of a profile transfer retry operation according to certain embodiments.

FIG. 18 illustrates a signal sequence of a retry operation when a retry input is received via a user interface, for example, the user interface 1700 shown in FIG. 17, according to some embodiments.

The non-limiting example of FIG. 18 illustrates operations between an electronic device (or a device) 300, an eUICC device management server 410 (hereinafter referred to as "server 410"), an SM-DP+ server 401, and an external electronic device 1400, operations between an eUICC 320, an LPA 310, and an ReDM 330 in the electronic device 300, and operations between an eUICC 1420, an LPA 1410, and an ReDM 1430 in the external electronic device 1400. According to certain embodiments, each operation below may be performed by a processor or an eUICC 320 or 1420. The processor may execute instructions stored in a memory for each operation.

In operation 1801, the electronic device 300 may obtain a user input for a transfer retry through the LPA 310. For example, the user input may be a selection input of a user for a retry item on a screen 1700 of FIG. 17.

According to various embodiments, a profile transfer retry operation may be the same or similar to a profile transfer operation. For example, operations 1803 to 1825 may, in certain embodiments, correspond to operations 1519 to 1541 of FIG. 15, respectively.

Figure 19:
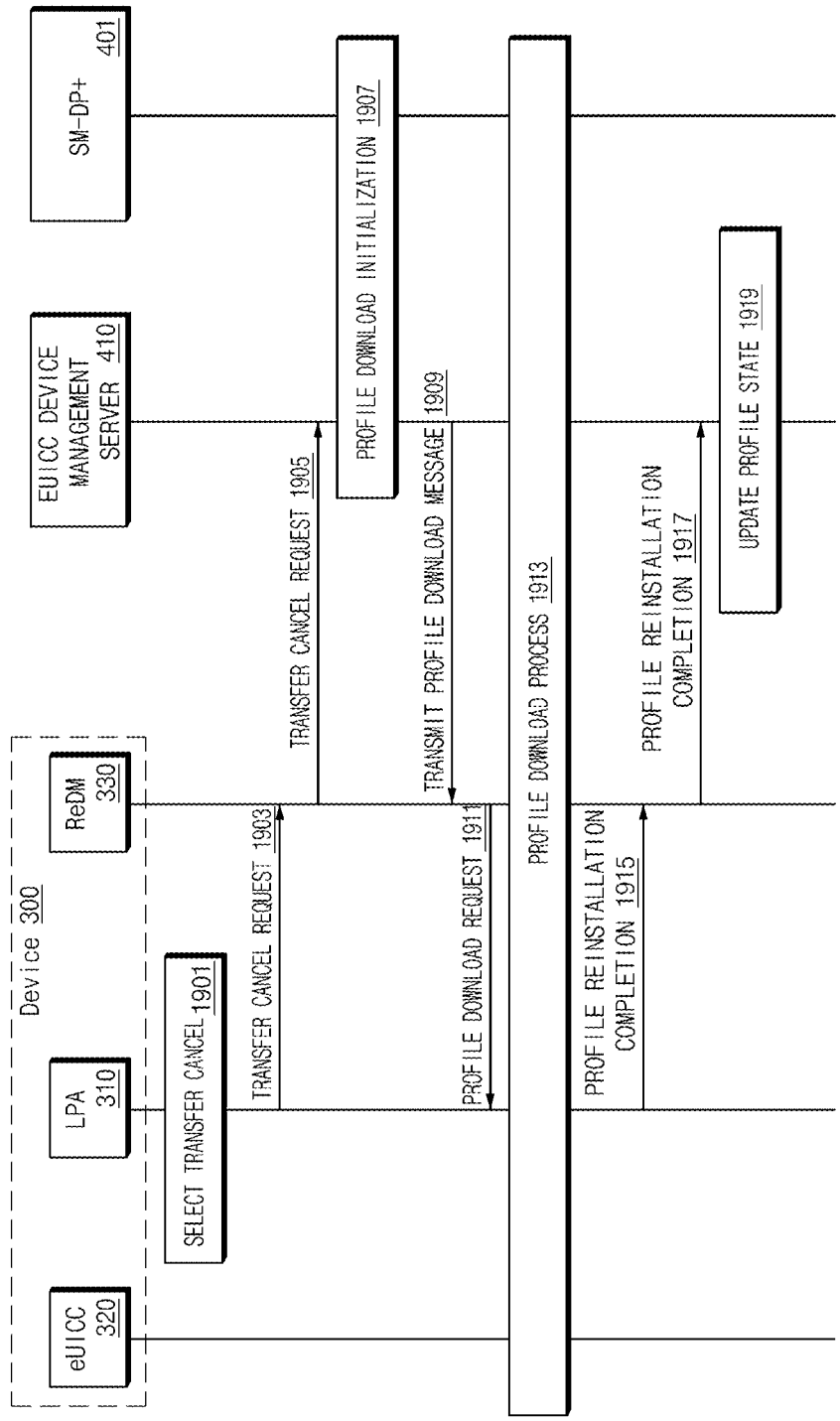
FIG. 19 illustrates a signal sequence of a profile transfer cancel operation according to various embodiments.

FIG. 19 illustrates a signal sequence of a profile transfer cancel operation according to some embodiments.

FIG. 19 illustrates operations between an electronic device (or a device) 300, an eUICC device management server 410 (hereinafter referred to as "server 410"), and an SM-DP+ server 401 and operations between an eUICC 320, an LPA 310, and an ReDM 330 in the electronic device 300. According to certain embodiments, each operation below may be performed by a processor or an eUICC 320. The processor may execute instructions stored in a memory for each operation.

Referring to the non-limiting example of FIG. 19, the electronic device 300 may cancel a profile transfer retry and may reinstall a profile.

In operation 1901, the electronic device 300 may obtain a user input for transfer retry cancel through the LPA 310. For example, the user input may be a selection input of a user for a cancel item on a screen 1700 of FIG. 17.

In operation 1903, the LPA 310 may deliver a profile transfer cancel request to the ReDM 330 in response to the user input.

In operation 1905, the ReDM 330 may transmit the profile transfer cancel request to the server 410. The ReDM 330 may configure a transfer cancel request message and may transmit the transfer cancel request message to the server 410. The transfer cancel request message may include an identifier (e.g., an EID) of the electronic device 300 which cancels transfer and/or an identifier (e.g., an ICCID) of a profile transmitted from a transfer error message.

When the transfer of the profile is cancelled, a profile may be reinstalled in the electronic device 300.

In operation 1907, in response to the transfer cancel request, the server 410 may perform a profile download initiation process with the SM-DP+ server 401 to reinstall a profile in the electronic device 300 which cancels transfer. The profile download initiation process may, in various embodiments, correspond to the process described with reference to FIG. 8 of this disclosure.

Thereafter, a profile download process may be performed in the electronic device 300.

In operation 1909, the server 410 may transmit a profile download message to the ReDM 330 of the electronic device 300. In operation 1911, the ReDM 330 may deliver a profile download request to the LPA 310. In operation 1913, the electronic device 300 may download a profile. Such an operation may refer to the GSMA technical specification.

When the installation of the profile is completed, in operation 1915, the LPA 310 may deliver the result of installing the profile to the ReDM 330. The LPA 310 may deliver a profile reinstallation completion message to the ReDM 330.

In operation 1917, the ReDM 330 may transmit the result to the server 410. The ReDM 330 may transmit the reinstallation completion message to the server 410.

In operation 1919, the server 410 may obtain the result and may update a profile state of the user.

According to various embodiments, although a profile is installed in an electronic device, when the user does not use the profile, the profile may be kept. Hereinafter, a description will be given of a method of keeping the profile, an operation of managing the kept profile, and a method of reinstalling a profile after keeping the profile.

Figure 20:
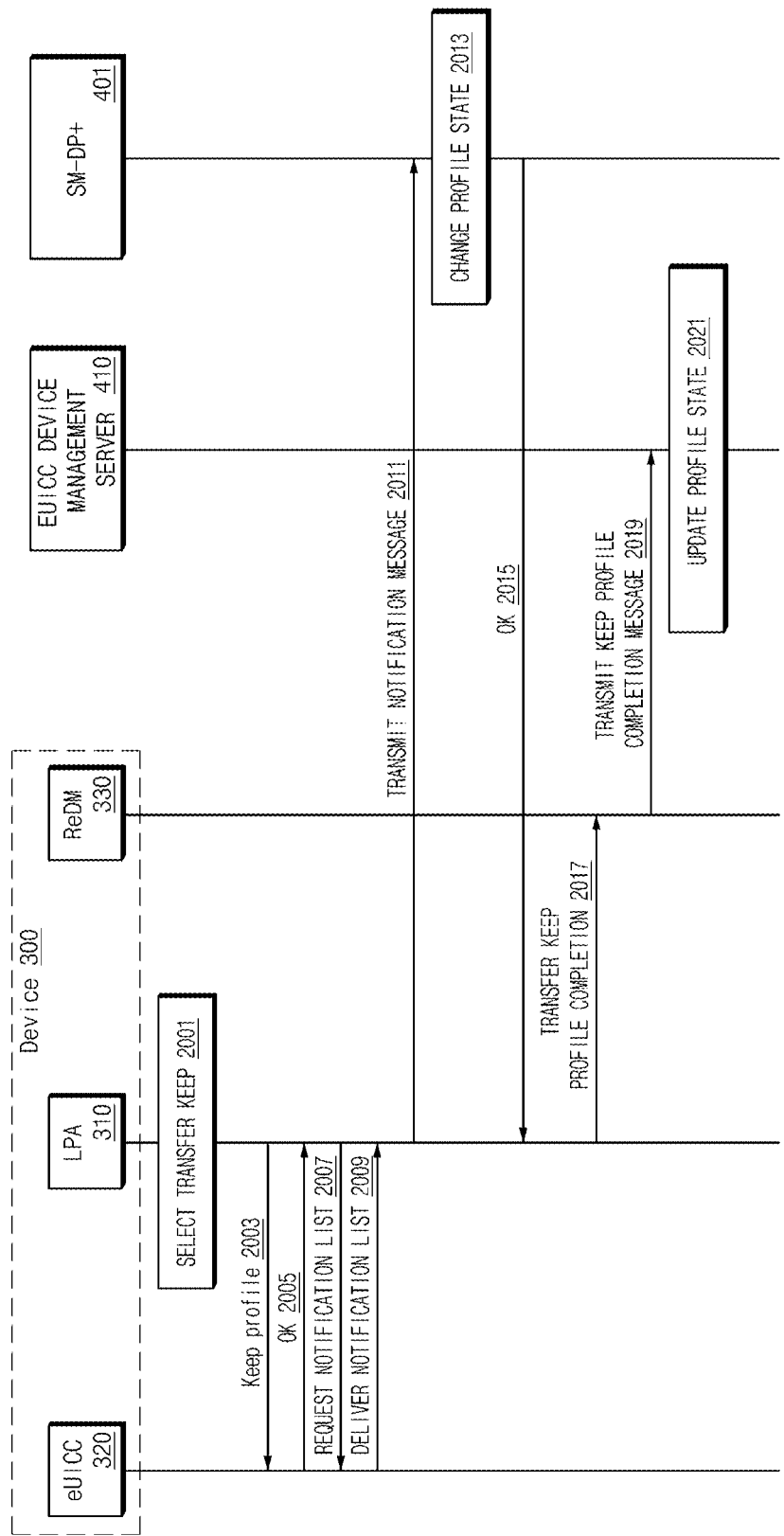
FIG. 20 illustrates a signal sequence of an operation of keeping a profile according to certain embodiments.

FIG. 20 illustrates a signal sequence for an operation of keeping a profile according to some embodiments.

The non-limiting example of FIG. 20 illustrates operations between an electronic device (or a device) 300, an eUICC device management server 410 (hereinafter referred to as "server 410"), and an SM-DP+ server 401 and operations between an eUICC 320, an LPA 310, and an ReDM 330 in the electronic device 300. According to certain embodiments, each operation below may be performed by a processor or an eUICC 320. The processor may execute instructions stored in a memory for each operation.

In operation 2001, the electronic device 300 may obtain an input for device-to-device keep of a profile of the user. According to various embodiments, the user may select a profile to be kept. The electronic device 300 may obtain a user input through the LPA 310. According to some embodiments, the electronic device 300 may obtain a selection for a specific file on a screen 1200 shown in FIG. 12. For example, the electronic device 300 may obtain a touch input for the specific profile or may obtain a selection for a keep menu provided for a profile, and may explicitly trigger to keep the profile.

In operation 2003, the LPA 310 may deliver a keep profile command to the eUICC 320 with respect to the selected profile. The LPA 310 may configure the keep profile command and may deliver the keep profile command to the eUICC 320. The keep profile command may be defined as local profile management.

The keep profile command may have the following characteristics and operations a) to d).

a) When the LPA 310 delivers a "keep profile" command to the eUICC 320, it delivers an ICCID or an ISD-P AID to notify the eUICC 320 of the identity of the profile to be kept.

b) Upon receiving the "keep profile" command, the eUICC 320 may delete the profile from a memory not to show the profile to the user anymore. In other words, although an ES10c.GetProfilesInfo( ) command, as defined in the GSMA "SGP.22 spec ver 2.1" is executed, the profile may fail to be included and transferred in a profile list.

c) The eUICC 320 may perform the "keep profile" command and may then generate a notification for "keep profile".

d) When the keep profile notification is transmitted to the SM-DP+ server 401, the SM-DP+ server 401 may change a state of the profile to a "kept" state.

According to various embodiments, at operation 2005, the keep profile command may be performed. In operation 2005, the eUICC 320 may deliver a response (OK of FIG. 20) to the command to the LPA 310. Thereafter, when the keep profile command is performed, the eUICC 320 may generate a notification list for providing a notification of a state change. Generating the notification list may be changing a profile state of the SM-DP+ server 401.

In operation 2007, the LPA 310 may request the eUICC 320 to deliver the notification list. In operation 2009, the eUICC 320 may deliver the notification list to the LPA 310 in response to the request.

Referring again to Table 6 above, Table 6 above represents a notification event used when the LPA 310 requests the eUICC 320 to deliver the notification list. The notification event may include information "notificationKeep" associated with keeping a profile defined in Table 6 above.

In operation 2011, the LPA 310 may transmit a notification message to the SM-DP+ server 401. The notification message may be a message for providing a notification that a profile state is a "keep" state.

In operation 2013, the SM-DP+ server 401 may change a state of the profile to the "keep" state in response to the notification message. In operation 2015, the SM-DP+ server 401 may transmit a response message (OK) to the notification message to the LPA 310.

Table 1 above is a table defining a profile state of the SM-DP+ server 401, described in the GSMA "SGP.22 spec version 2.1". As defined in Table 5 above, a "keep" state may be added to Table 1 above.

TABLE 7

Keep: In a state, such as an available state, capable of performing profile download initiation, a download preparation process is performed through an eUICC device management server in the state.

In operation 2017, the LPA 310 may deliver a result for providing a notification of keep profile completion to the ReDM 330. In operation 2019, the ReDM 330 may transmit the result to the server 410. The ReDM 330 may transmit a keep profile completion message to the server 410. The keep profile completion message may include at least one of a user account, an identifier (e.g., an EID) of the electronic device 300, an identifier (e.g., an ICCID) of a kept profile, or an SM-DP+ address obtained based on a notification message.

In operation 2021, the server 410 may update a state of the profile. The state of the profile may be updated in a "keep" state to an eUICC device profile list DB (for example, an eUICC device profile list DB 620 of FIG. 6).

Figure 21:
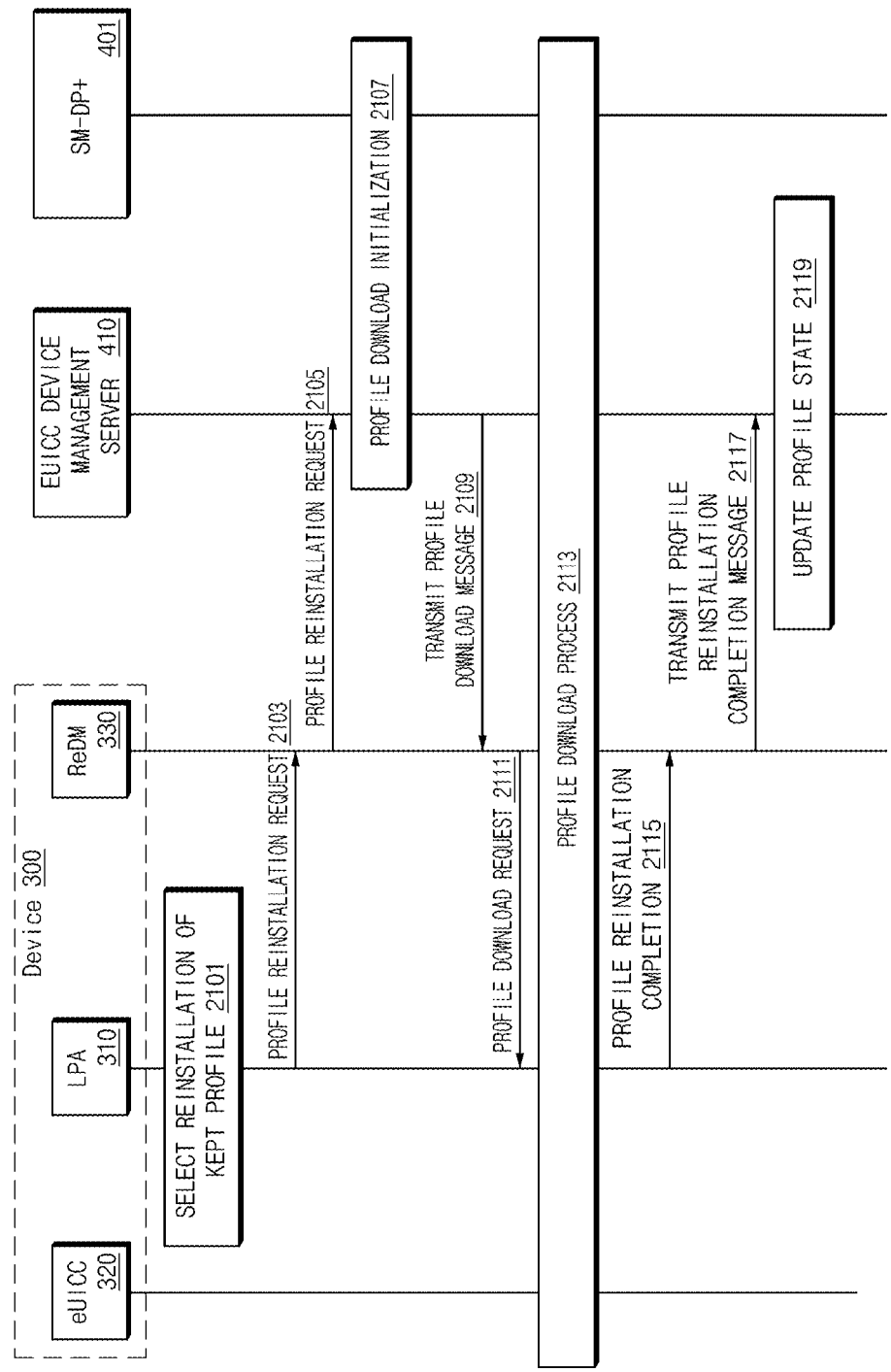
FIG. 21 illustrates a signal sequence of an operation of reinstalling a kept profile in an electronic device according to certain embodiments.

FIG. 21 illustrates a signal sequence of an operation of reinstalling a kept profile in an electronic device according to certain embodiments.

The non-limiting example of FIG. 21 illustrates operations between an electronic device (or a device) 300, an eUICC device management server 410 (hereinafter referred to as "server 410"), and an SM-DP+ server 401 and operations between an eUICC 320, an LPA 310, and an ReDM 330 in the electronic device 300. According to various embodiments, each operation below may be performed by a processor or an eUICC 320. The processor may execute instructions stored in a memory for each operation.

In operation 2101, the electronic device 300 may obtain an input for reinstallation of a kept profile. According to some embodiments, a user may select a profile to be reinstalled. For example, the user may select one of a plurality of kept profiles. The electronic device 300 may obtain a user input through the LPA 310. According to certain embodiments, the electronic device 300 may obtain a selection for a specific profile.

When reinstallation of the kept profile is triggered (or in response to the user input), in operation 2103, the LPA 310 may deliver a profile reinstallation request to the ReDM 330. The LPA 310 may deliver a profile installation request message to the ReDM 330.

In operation 2015, the ReDM 330 may deliver the profile reinstallation request to the server 410. The ReDM 330 may deliver the profile reinstallation request message to the server 410. The profile reinstallation request message may include an identifier (e.g., an EID) of the electronic device 300 and an identifier (e.g., an ICCID) of a profile to be reinstalled.

In operation 2107, in response to the profile reinstallation request, the server 410 may perform a profile download initiation process with the SM-DP+ server 401 to reinstall a profile. According to various embodiments, the profile download initiation process may be as described in the non-limiting example of FIG. 8 of this disclosure.

Thereafter, a profile download process may be performed between the server 410 and the SM-DP+ server 401.

In operation 2109, the server 410 may transmit a profile download message to the ReDM 330 of the electronic device 300. In operation 2111, the ReDM 330 may deliver a profile download request to the LPA 310. The ReDM 330 may deliver a profile download request message to the LPA 310. In operation 2113, the electronic device 300 may perform a profile download process. Such an operation may, in certain embodiments, be as described in GSMA technical specification.

When the reinstallation of the profile is completed, in operation 2115, the LPA 310 may deliver the result of reinstalling the profile to the ReDM 330. The LPA 310 may deliver a profile reinstallation completion message to the ReDM 330.

In operation 2117, the ReDM 330 may transmit the result to the server 410. The ReDM 330 may transmit the reinstallation completion message to the server 410.

In operation 2119, the server 410 may obtain the result and may update a profile state of the user.

According to various embodiments, an electronic device may include a wireless communication circuit configured to provide wireless communication of at least one cellular network, a secure element configured to store information associated with the wireless communication, the information including a first identifier indicating the secure element and at least one second identifier indicating a profile for a wireless communication service provided by the at least one cellular network, at least one processor configured to be operatively connected with the wireless communication circuit and the secure element, and a memory configured to be operatively connected with the at least one processor and store instructions.

The instructions, when executed, may cause the at least one processor to transmit the first identifier to a first external server configured to store the first identifier to be associated with a user account, via the wireless communication circuit, receive a second identifier and a profile associated with the second identifier from the second external server via the wireless communication circuit, store the second identifier and the profile in the secure element, and receive a first request, including the second identifier, associated with management of the profile, from the first external server via the wireless communication circuit.

According to some embodiments, the at least one processor may include a communication processor and an application processor.

According to certain embodiments, the management of the profile may include at least one of enabling, disabling, deleting, installing, transferring, or keeping the profile.

According to various embodiments, the keeping may correspond to keeping in only the second external server rather than the electronic device.

According to some embodiments, the instructions, when executed by the at least one processor, may cause the at least one processor to access the first identifier and the at least one second identifier using application programming interfaces.

According to certain embodiments, at least some of the instructions, when executed by the at least one processor, may cause the at least one processor to comply with a global systems for mobile communications association (GSMA) remote subscriber identity module (SIM) provisioning (RSP) technical specification.

According to various embodiments, the first identifier may be an embedded universal integrated circuit card identification (EID), and the second identifier may be an integrated circuit card identifier (ICCID).

According to some embodiments, the secure element may comply with the GSMA RSP technical specification.

According to certain embodiments, an electronic device may include a wireless communication circuit configured to provide wireless communication of at least one cellular network, a secure element circuit configured to store a profile for a wireless communication service provided by the at least one cellular network, at least one processor configured to be operatively connected with the wireless communication circuit and the secure element circuit, and a memory configured to be operatively connected with the at least one processor and store instructions.

The instructions, when executed by the at least one processor, may cause the at least one processor to obtain at least one second identifier indicating a profile stored in an external device, via the wireless communication circuit and transmit a request, including a first identifier indicating the electronic device and a specific second identifier among the at least one second identifier, associated with management of a profile corresponding to the specific second identifier, via the wireless communication circuit.

The instructions, when executed by the at least one processor, may cause the at least one processor to transmit the request to an external server.

The instructions, when executed by the at least one processor, may cause the at least one processor to transmit a request associated with the at least one second identifier to the external serve.

According to various embodiments, the request may include a third identifier indicating a secure element of the external device.

According to some embodiments, the instructions, when executed by the at least one processor, may cause the at least one processor to obtain state information of a profile corresponding to the at least one second identifier and store the obtained information in the memory.

According to certain embodiments, the instructions, when executed by the at least one processor, may cause the at least one processor to obtain a response associated with management of the profile, in response to the request, and change a profile state of the external device in response to the response.

According to various embodiments, the instructions, when executed by the at least one processor, may cause the at least one processor to obtain a user input associated with a profile corresponding to the specific second identifier and transmit the request in response to the user input.

According to some embodiments, the management of the profile may include at least one of enabling, disabling, installing, deleting, transferring, or keeping the profile.

According to certain embodiments, the secure element circuit may comply with a GSMA RSP technical specification.

According to various embodiments, the first identifier may be an EID, and the second identifier may be an ICCID.

According to some embodiments, a server may include a wireless communication circuit configured to provide wireless communication of at least one cellular network, at least one processor configured to be operatively connected with the wireless communication circuit, and a memory configured to be operatively connected with the at least one processor and store instructions. The instructions, when executed by the at least one processor, may cause the at least one processor to obtain a request associated with management of a profile stored in a secure element of a second electronic device, from a first electronic device including a secure element configured to store a profile for a wireless communication service provided to the first electronic device by the at least one cellular network and transmit the request associated with the management of the profile to the second electronic device.

According to certain embodiments, the request may include an identifier indicating the profile.

Figure 22:
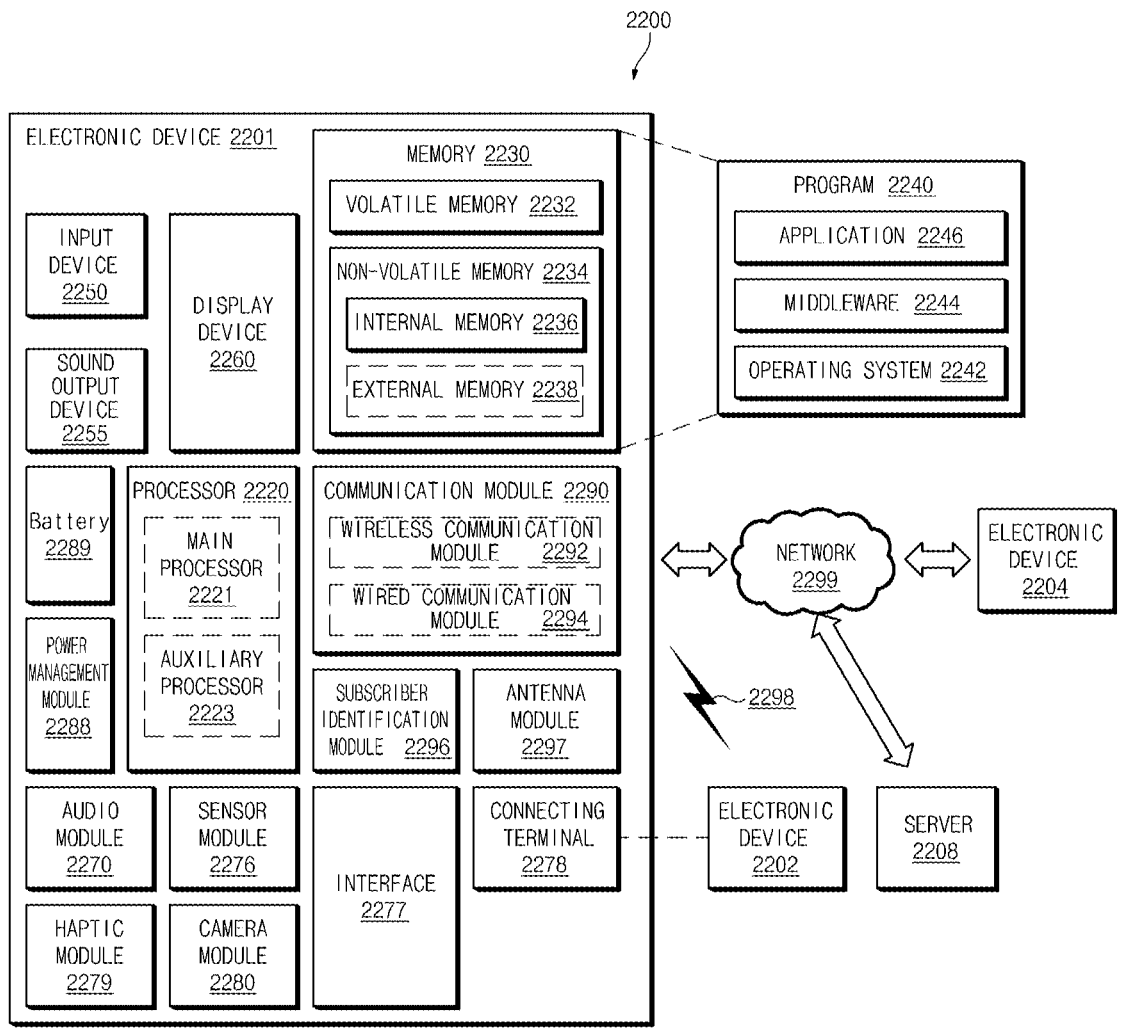
FIG. 22 illustrates, in block diagram format, a configuration of an electronic device in a network environment according to various embodiments.

FIG. 22 illustrates, in block diagram format, an electronic device 2201 in a network environment 2200 according to various embodiments. Referring to the non-limiting example of FIG. 22, the electronic device 2201 (for example, the electronic device 100 in FIG. 1) in the network environment 2200 may communicate with an electronic device 2202 (e.g., the server 200 in FIG. 2 or the electronic device 1400 in FIG. 14) via a first network 2298 (e.g., a short-range wireless communication network), or an electronic device 2204 or a server 2208 (e.g., the server 200 in FIG. 2) via a second network 2299 (e.g., a long-range wireless communication network). According to various embodiments, the electronic device 2201 may communicate with the electronic device 2204 via the server 2208. According to some embodiments, the electronic device 2201 may include a processor 2220, memory 2230, an input device 2250, a sound output device 2255, a display device 2260, an audio module 2270, a sensor module 2276, an interface 2277, a haptic module 2279, a camera module 2280, a power management module 2288, a battery 2289, a communication module 2290, a subscriber identification module (SIM) 2296, or an antenna module 2297. In some embodiments, at least one (e.g., the display device 2260 or the camera module 2280) of the components may be omitted from the electronic device 2201, or one or more other components may be added in the electronic device 2201. In some embodiments, some of the components may be implemented as single integrated circuitry. For example, the sensor module 2276 (e.g., a fingerprint sensor, an iris sensor, or an illuminance sensor) may be implemented as embedded in the display device 2260 (e.g., a display).

The processor 2220 (e.g., the processor 110 in FIG. 1) may execute, for example, software (e.g., a program 2240) to control at least one other component (e.g., a hardware or software component) of the electronic device 2201 coupled with the processor 2220, and may perform various data processing or computation. According to one embodiment, as at least part of the data processing or computation, the processor 2220 may load a command or data received from another component (e.g., the sensor module 2276 or the communication module 2290) in volatile memory 2232, process the command or the data stored in the volatile memory 2232, and store resulting data in non-volatile memory 2234. According to certain embodiments, the processor 2220 may include a main processor 2221 (e.g., a central processing unit (CPU) or an application processor (AP)), and an auxiliary processor 2223 (e.g., a graphics processing unit (GPU), an image signal processor (ISP), a sensor hub processor, or a communication processor (CP)) that is operable independently from, or in conjunction with, the main processor 2221. Additionally or alternatively, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display device 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to various embodiments, the auxiliary processor 2223 (e.g., an image signal processor or a communication processor) may be implemented as part of another component (e.g., the camera module 2280 or the communication module 2290) functionally related to the auxiliary processor 2223.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input device 2250 may receive a command or data to be used by other component (e.g., the processor 2220) of the electronic device 2201, from the outside (e.g., a user) of the electronic device 2201. The input device 2250 may include, for example, a microphone, a mouse, a keyboard, or a digital pen (e.g., a stylus pen).

The sound output device 2255 may output sound signals to the outside of the electronic device 2201. The sound output device 2255 may include, for example, a speaker or a receiver. The speaker may be used for general purposes, such as playing multimedia or playing record, and the receiver may be used for an incoming calls. According to some embodiments, the receiver may be implemented as separate from, or as part of the speaker.

The display device 2260 may visually provide information to the outside (e.g., a user) of the electronic device 2201. The display device 2260 may include, for example, a display, a hologram device, or a projector and control circuitry to control a corresponding one of the display, hologram device, and projector. According to certain embodiments, the display device 2260 may include touch circuitry adapted to detect a touch, or sensor circuitry (e.g., a pressure sensor) adapted to measure the intensity of force incurred by the touch.

The audio module 2270 may convert a sound into an electrical signal and vice versa. According to various embodiments, the audio module 2270 may obtain the sound via the input device 2250, or output the sound via the sound output device 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to some embodiments, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to certain embodiments, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to various embodiments, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to some embodiments, the haptic module 2279 may include, for example, a motor, a piezoelectric element, or an electric stimulator.

The camera module 2280 may capture a still image or moving images. According to certain embodiments, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to various embodiments, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to some embodiments, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as BLUETOOTH™, wireless-fidelity (Wi-Fi) direct, or infrared data association (IrDA)) or the second network 2299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The antenna module 2297 may transmit or receive a signal or power to or from the outside (e.g., the external electronic device) of the electronic device 2201. According to certain embodiments, the antenna module 2297 may include an antenna including a radiating element composed of a conductive material or a conductive pattern formed in or on a substrate (e.g., PCB). According to various embodiments, the antenna module 2297 may include a plurality of antennas. In such a case, at least one antenna appropriate for a communication scheme used in the communication network, such as the first network 2298 or the second network 2299, may be selected, for example, by the communication module 2290 (e.g., the wireless communication module 2292) from the plurality of antennas. The signal or the power may then be transmitted or received between the communication module 2290 and the external electronic device via the selected at least one antenna. According to some embodiments, another component (e.g., a radio frequency integrated circuit (RFIC)) other than the radiating element may be additionally formed as part of the antenna module 2297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to certain embodiments, commands or data may be transmitted or received between the electronic device 2201 and the external electronic device 2204 via the server 2208 coupled with the second network 2299. Each of the electronic devices 2202 and 2204 may be a device of a same type as, or a different type, from the electronic device 2201. According to various embodiments, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to some embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to certain embodiments, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Various embodiments according to this disclosure may be implemented as a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with reference to various embodiments, various changes and modifications may be suggested to one skilled in the art. It is intended that the present disclosure encompass such changes and modifications as fall within the scope of the appended claims.

What is claimed is:

1. An electronic device, comprising:
   a wireless communication circuit configured to provide wireless communication over at least one cellular network;
   an embedded universal integrated circuit card (eUICC) configured to store a profile for a wireless communication service provided over the at least one cellular network and information associated with the wireless communication circuit, the information associated with the wireless communication circuit including a first eUICC identification (eID) indicating the UICC and a first integrated circuit card identification (ICCID) indicating the profile;
   at least one processor configured to be operatively connected with the wireless communication circuit and the UICC; and
   a memory configured to be operatively connected with the at least one processor and store a remote eUICC device manager (ReDM), a local profile assistant (LPA), and instructions,
   wherein the instructions, when executed by the least one processor, cause the electronic device to:
      transmit, to an external server using an embedded software 6 (ES6) interface by the ReDM, the first eID and a user account information of a user of the electronic device for the external server to register the electronic device by storing the first eID to be associated with the user account information, via the wireless communication circuit;
      receive, from the external server using the ES6 interface by the ReDM, a first remote profile management request that is generated by an external electronic device and transmitted from the external electronic device to the external server, wherein the external electronic device is associated with the user account information, and the first remote profile management request includes the first eID, the first ICCID, a second ID of another eUICC of the external electronic device;

transmit, from the ReDM to the LPA using an embedded software 7 (ES7) interface by the ReDM, the first remote profile management request;

transmit, from the LPA to the eUICC using an embedded software 10x (ES10x) interface by the LPA, the first remote profile management request, such that the eUICC performs a profile state change of the profile in response to the first remote profile management request;

receive, from the eUICC using the ES10x interface by the LPA, a result of performing the profile state change of the profile;

transmit, from the LPA to the ReDM using ES7 interface by the LPA, the result of performing the profile state change; and transmit, from the ReDM to the external server using the ES6 interface by ReDM, a response indicating the result of performing the profile state change, wherein the response includes the first eID, the first ICCID, the second eID of the other eUICC of the external electronic device such that the response is delivered to the external electronic device, wherein a management of the profile according to first remote profile management request comprises at least one of enabling, or disabling the profile stored in the eUICC.

2. The electronic device of claim 1, wherein the at least one processor comprises a communication processor and an application processor.

3. The electronic device of claim 1, wherein the management of the profile further comprises at least one of deleting, installing, transferring, or keeping the profile.

4. The electronic device of claim 3, wherein the keeping corresponds to keeping in only the external server rather than the electronic device.

5. The electronic device of claim 1, wherein at least some of the instructions, when executed by the at least one processor, cause the electronic device to comply with a global systems for mobile communications association (GSMA) remote subscriber identity module (SIM) provisioning (RSP) technical specification version 2.1.

6. The electronic device of claim 1, wherein the eUICC complies with a global systems for mobile communications association (GSMA) remote subscriber identity module (SIM) provisioning (RSP) technical specification version 2.1.

7. An electronic device, comprising:
a wireless communication circuit configured to provide wireless communication over at least one cellular network;
an embedded universal integrated circuit card (eUICC) configured to store a profile for a wireless communication service provided over the at least one cellular network, a first eUICC identification (eID) indicating the eUICC, and a first integrated circuit card identification (ICCID) indicating the profile;
at least one processor configured to be operatively connected with the wireless communication circuit and the UICC; and
a memory configured to be operatively connected with the at least one processor and store a remote eUICC device manager (ReDM), a local profile assistant (LPA), and instructions, wherein the instructions, when executed by the at least one processor, cause the electronic device to:
obtain a second eID indicating another eUICC of an external electronic device and a second ICCID indicating another profile stored in the other eUICC of the external electronic device, via the wireless communication circuit, wherein the external electronic device is associated with a user account of the electronic device and the second eID of the external electronic device is registered in an external server to be associated with the user account; and generate, using LPA, a first remote profile management request that includes the first eID, the second ICCID, the second eID of the other eUICC of the external electronic device;

transmit, from the LPA to the ReDM using an embedded software 7 (ES7) interface by the LPA, the first remote profile management request;

transmit, from the ReDM to the external server using an embedded software 6 (ES6) interface by ReDM, the first remote profile management request; and receive, from the external server using the ES6 interface by ReDM, a response indicating a result of a profile state change of the other profile in response to the first remote profile management request, wherein the response is generated by the external electronic device and transmitted from the external electronic device to the external server, and includes the first eID, the second ICCID, the second eID, wherein a management of the other profile according to the first remote profile management request comprises at least one of enabling, or disabling the other profile stored in the other eUICC.

8. The electronic device of claim 7, wherein the instructions, when executed by the at least one processor, cause the electronic device to:
obtain state information of another profile from the external server; and
store the obtained state information in the memory.

9. The electronic device of claim 8, wherein the instructions, when executed by the at least one processor, cause the electronic device to:
obtain a response associated with management of the other profile, in response to the first remote profile management request; and
change a profile state of the external electronic device in response to the response.

10. The electronic device of claim 7, wherein the instructions, when executed by the at least one processor, cause the electronic device to:
obtain a user input associated with the other profile; and
transmit the first remote profile management request in response to the user input.

11. The electronic device of claim 7, wherein management of the other profile further comprises at least one of installing, deleting, transferring, or keeping the other profile.

12. The electronic device of claim 7, wherein the eUICC complies with a global systems for mobile communications association (GSMA) remote subscriber identity module (SIM) provisioning (RSP) technical specification version 2.1.

13. A server, comprising:
a wireless communication circuit configured to provide wireless communication over at least one cellular network;
at least one processor configured to be operatively connected with the wireless communication circuit; and a memory configured to be operatively connected with the at least one processor and store instructions, wherein the instructions, when executed by the at least one processor, cause the server to:

receive, from a first remote embedded universal integrated circuit card (eUICC) device manager (ReDM) of a first electronic device using an embedded software 6 (ES6) interface, a first eUICC identification (eID) indicating first eUICC of the first electronic device, via the wireless communication circuit;

in response to receiving the first eID, store the first eID to be associated with a user account of the first electronic device;

transmit, to a second ReDM of a second electronic device using the ES6 interface, a first integrated circuit card identification (ICCID) indicating a profile stored in the first eUICC of the first electronic device, via the wireless communication circuit;

receive, from the second ReDM using the ES6 interface, a first remote profile management request is generated by the second electronic device, wherein the first remote profile management request includes the first eID, the first ICCID, a second eID of a second eUICC of the second electronic device;

transmit the first remote profile management request to the first ReDM using the ES6 interface such that the first eUICC performs a profile state change of the profile in response to the first remote profile management request;

receive, from the first ReDM using the ES6 interface, a response indicating a result of performing the profile state change of the profile, wherein the response is generated by the first electronic device, and includes the first eID, the first ICCID, the second eID; and transmit, to the second ReDM using the ES6 interface, the response, wherein a management of the profile according to first remote profile management request comprises at least one of enabling, or disabling the profile stored in the first eUICC.

* * * * *